(12) United States Patent
Shalvi

(10) Patent No.: US 8,239,734 B1
(45) Date of Patent: Aug. 7, 2012

(54) EFFICIENT DATA STORAGE IN STORAGE DEVICE ARRAYS

(75) Inventor: Ofir Shalvi, Ra'anana (IL)

(73) Assignee: Apple Inc., Cupertino, CA (US)

( * ) Notice: Subject to any disclaimer, the term of this patent is extended or adjusted under 35 U.S.C. 154(b) by 309 days.

(21) Appl. No.: 12/579,432

(22) Filed: Oct. 15, 2009

Related U.S. Application Data

(60) Provisional application No. 61/105,580, filed on Oct. 15, 2008.

(51) Int. Cl.
*G06F 11/00* (2006.01)

(52) U.S. Cl. .................. 714/770; 714/763; 714/769

(58) Field of Classification Search .................. 714/764, 714/768, 769, 770, 773
See application file for complete search history.

(56) References Cited

U.S. PATENT DOCUMENTS

| | | |
|---|---|---|
| 3,668,631 A | 6/1972 | Griffith et al. |
| 3,668,632 A | 6/1972 | Oldham |
| 4,058,851 A | 11/1977 | Scheuneman |
| 4,112,502 A | 9/1978 | Scheuneman |
| 4,394,763 A | 7/1983 | Nagano et al. |
| 4,413,339 A | 11/1983 | Riggle et al. |
| 4,556,961 A | 12/1985 | Iwahashi et al. |
| 4,558,431 A | 12/1985 | Satoh |
| 4,608,687 A | 8/1986 | Dutton |
| 4,654,847 A | 3/1987 | Dutton |
| 4,661,929 A | 4/1987 | Aoki et al. |
| 4,768,171 A | 8/1988 | Tada |
| 4,811,285 A | 3/1989 | Walker et al. |
| 4,899,342 A | 2/1990 | Potter et al. |
| 4,910,706 A | 3/1990 | Hyatt |
| 4,993,029 A | 2/1991 | Galbraith et al. |
| 5,056,089 A | 10/1991 | Furuta et al. |
| 5,077,722 A | 12/1991 | Geist et al. |
| 5,126,808 A | 6/1992 | Montalvo et al. |
| 5,163,021 A | 11/1992 | Mehrotra et al. |
| 5,172,338 A | 12/1992 | Mehrotra et al. |
| 5,182,558 A | 1/1993 | Mayo |
| 5,182,752 A | 1/1993 | DeRoo et al. |

(Continued)

FOREIGN PATENT DOCUMENTS

EP 0783754 B1 7/1997

(Continued)

OTHER PUBLICATIONS

Huffman, A., "Non-Volatile Memory Host Controller Interface (NVMHCI)", Specification 1.0, Apr. 14, 2008.

(Continued)

*Primary Examiner* — Marc Duncan

(74) *Attorney, Agent, or Firm* — Meyertons, Hood, Kivlin, Kowert & Goetzel, P.C.

(57) ABSTRACT

A method for data storage includes encoding data with an inter-device Error Correction Code (ECC), and sending the encoded data for storage on two or more storage devices. The data to be stored on each of the storage devices, and which has been encoded with the inter-device ECC, is encoded with an intra-device ECC, and the data encoded with the inter-device and intra-device ECCs is stored on the storage device. After storing the data, at least part of the stored data is retrieved and output by decoding the intra-device and inter-device ECCs, while using information related to one of the intra-device and inter-device ECCs in decoding the other of the intra-device and inter-device ECCs.

28 Claims, 4 Drawing Sheets

U.S. PATENT DOCUMENTS

| | | | |
|---|---|---|---|
| 5,191,584 A | 3/1993 | Anderson |
| 5,200,959 A | 4/1993 | Gross et al. |
| 5,237,535 A | 8/1993 | Mielke et al. |
| 5,272,669 A | 12/1993 | Samachisa et al. |
| 5,276,649 A | 1/1994 | Hoshita et al. |
| 5,287,469 A | 2/1994 | Tsuboi |
| 5,365,484 A | 11/1994 | Cleveland et al. |
| 5,388,064 A | 2/1995 | Khan |
| 5,416,646 A | 5/1995 | Shirai |
| 5,416,782 A | 5/1995 | Wells et al. |
| 5,446,854 A | 8/1995 | Khalidi et al. |
| 5,450,424 A | 9/1995 | Okugaki et al. |
| 5,469,444 A | 11/1995 | Endoh et al. |
| 5,473,753 A | 12/1995 | Wells et al. |
| 5,479,170 A | 12/1995 | Cauwenberghs et al. |
| 5,508,958 A | 4/1996 | Fazio et al. |
| 5,519,831 A | 5/1996 | Holzhammer |
| 5,532,962 A | 7/1996 | Auclair et al. |
| 5,533,190 A | 7/1996 | Binford et al. |
| 5,541,886 A | 7/1996 | Hasbun |
| 5,600,677 A | 2/1997 | Citta et al. |
| 5,638,320 A | 6/1997 | Wong et al. |
| 5,657,332 A | 8/1997 | Auclair et al. |
| 5,675,540 A | 10/1997 | Roohparvar |
| 5,682,352 A | 10/1997 | Wong et al. |
| 5,687,114 A | 11/1997 | Khan |
| 5,696,717 A | 12/1997 | Koh |
| 5,726,649 A | 3/1998 | Tamaru et al. |
| 5,726,934 A | 3/1998 | Tran et al. |
| 5,742,752 A | 4/1998 | De Koening |
| 5,748,533 A | 5/1998 | Dunlap et al. |
| 5,748,534 A | 5/1998 | Dunlap et al. |
| 5,751,637 A | 5/1998 | Chen et al. |
| 5,761,402 A | 6/1998 | Kaneda et al. |
| 5,798,966 A | 8/1998 | Keeney |
| 5,799,200 A | 8/1998 | Brant et al. |
| 5,801,985 A | 9/1998 | Roohparvar et al. |
| 5,838,832 A | 11/1998 | Barnsley |
| 5,860,106 A | 1/1999 | Domen et al. |
| 5,867,114 A | 2/1999 | Barbir |
| 5,867,428 A | 2/1999 | Ishii et al. |
| 5,867,429 A | 2/1999 | Chen et al. |
| 5,877,986 A | 3/1999 | Harari et al. |
| 5,889,937 A | 3/1999 | Tamagawa |
| 5,901,089 A | 5/1999 | Korsh et al. |
| 5,909,449 A | 6/1999 | So et al. |
| 5,912,906 A | 6/1999 | Wu et al. |
| 5,930,167 A | 7/1999 | Lee et al. |
| 5,937,424 A | 8/1999 | Leak et al. |
| 5,942,004 A | 8/1999 | Cappelletti |
| 5,946,716 A | 8/1999 | Karp et al. |
| 5,969,986 A | 10/1999 | Wong et al. |
| 5,982,668 A | 11/1999 | Ishii et al. |
| 5,991,517 A | 11/1999 | Harari et al. |
| 5,995,417 A | 11/1999 | Chen et al. |
| 6,009,014 A | 12/1999 | Hollmer et al. |
| 6,009,016 A | 12/1999 | Ishii et al. |
| 6,023,425 A | 2/2000 | Ishii et al. |
| 6,034,891 A | 3/2000 | Norman |
| 6,040,993 A | 3/2000 | Chen et al. |
| 6,041,430 A | 3/2000 | Yamauchi |
| 6,073,204 A | 6/2000 | Lakhani et al. |
| 6,101,614 A | 8/2000 | Gonzales et al. |
| 6,128,237 A | 10/2000 | Shirley et al. |
| 6,134,140 A | 10/2000 | Tanaka et al. |
| 6,134,143 A | 10/2000 | Norman |
| 6,134,631 A | 10/2000 | Jennings |
| 6,141,261 A | 10/2000 | Patti |
| 6,151,246 A | 11/2000 | So et al. |
| 6,157,573 A | 12/2000 | Ishii et al. |
| 6,166,962 A | 12/2000 | Chen et al. |
| 6,169,691 B1 | 1/2001 | Pasotti et al. |
| 6,178,466 B1 | 1/2001 | Gilbertson et al. |
| 6,185,134 B1 | 2/2001 | Tanaka et al. |
| 6,209,113 B1 | 3/2001 | Roohparvar |
| 6,212,654 B1 | 4/2001 | Lou et al. |
| 6,219,276 B1 | 4/2001 | Parker |
| 6,219,447 B1 | 4/2001 | Lee et al. |
| 6,222,762 B1 | 4/2001 | Guterman et al. |
| 6,230,233 B1 | 5/2001 | Lofgren et al. |
| 6,240,458 B1 | 5/2001 | Gilbertson |
| 6,259,627 B1 | 7/2001 | Wong |
| 6,275,419 B1 | 8/2001 | Guterman et al. |
| 6,278,632 B1 | 8/2001 | Chevallier |
| 6,279,069 B1 | 8/2001 | Robinson et al. |
| 6,288,944 B1 | 9/2001 | Kawamura |
| 6,292,394 B1 | 9/2001 | Cohen et al. |
| 6,301,151 B1 | 10/2001 | Engh et al. |
| 6,304,486 B1 | 10/2001 | Yano |
| 6,307,776 B1 | 10/2001 | So et al. |
| 6,314,044 B1 | 11/2001 | Sasaki et al. |
| 6,317,363 B1 | 11/2001 | Guterman et al. |
| 6,317,364 B1 | 11/2001 | Guterman et al. |
| 6,345,004 B1 | 2/2002 | Omura et al. |
| 6,360,346 B1 | 3/2002 | Miyauchi et al. |
| 6,363,008 B1 | 3/2002 | Wong |
| 6,363,454 B1 | 3/2002 | Lakhani et al. |
| 6,366,496 B1 | 4/2002 | Torelli et al. |
| 6,385,092 B1 | 5/2002 | Ishii et al. |
| 6,392,932 B1 | 5/2002 | Ishii et al. |
| 6,396,742 B1 | 5/2002 | Korsh et al. |
| 6,397,364 B1 | 5/2002 | Barkan |
| 6,405,323 B1 | 6/2002 | Lin et al. |
| 6,405,342 B1 | 6/2002 | Lee |
| 6,418,060 B1 | 7/2002 | Yong et al. |
| 6,442,585 B1 | 8/2002 | Dean et al. |
| 6,445,602 B1 | 9/2002 | Kokudo et al. |
| 6,452,838 B1 | 9/2002 | Ishii et al. |
| 6,456,528 B1 | 9/2002 | Chen |
| 6,466,476 B1 | 10/2002 | Wong et al. |
| 6,467,062 B1 | 10/2002 | Barkan |
| 6,469,931 B1 | 10/2002 | Ban et al. |
| 6,480,948 B1 | 11/2002 | Virajpet et al. |
| 6,490,236 B1 | 12/2002 | Fukuda et al. |
| 6,522,580 B2 | 2/2003 | Chen et al. |
| 6,525,952 B2 | 2/2003 | Araki et al. |
| 6,532,556 B1 | 3/2003 | Wong et al. |
| 6,538,922 B1 | 3/2003 | Khalid et al. |
| 6,549,464 B2 | 4/2003 | Tanaka et al. |
| 6,553,510 B1 | 4/2003 | Pekny et al. |
| 6,558,967 B1 | 5/2003 | Wong |
| 6,560,152 B1 | 5/2003 | Cernea |
| 6,567,311 B2 | 5/2003 | Ishii et al. |
| 6,577,539 B2 | 6/2003 | Iwahashi |
| 6,584,012 B2 | 6/2003 | Banks |
| 6,615,307 B1 | 9/2003 | Roohparvar |
| 6,621,739 B2 | 9/2003 | Gonzales et al. |
| 6,640,326 B1 | 10/2003 | Buckingham et al. |
| 6,643,169 B2 | 11/2003 | Rudelic et al. |
| 6,646,913 B2 | 11/2003 | Micheloni et al. |
| 6,678,192 B2 | 1/2004 | Gongwer et al. |
| 6,683,811 B2 | 1/2004 | Ishii et al. |
| 6,687,155 B2 | 2/2004 | Nagasue |
| 6,707,748 B2 | 3/2004 | Lin et al. |
| 6,708,257 B2 | 3/2004 | Bao |
| 6,714,449 B2 | 3/2004 | Khalid |
| 6,717,847 B2 | 4/2004 | Chen |
| 6,731,557 B2 | 5/2004 | Beretta |
| 6,732,250 B2 | 5/2004 | Durrant |
| 6,738,293 B1 | 5/2004 | Iwahashi |
| 6,751,766 B2 | 6/2004 | Guterman et al. |
| 6,757,193 B2 | 6/2004 | Chen et al. |
| 6,774,808 B1 | 8/2004 | Hibbs et al. |
| 6,781,877 B2 | 8/2004 | Cernea et al. |
| 6,804,805 B2 | 10/2004 | Rub |
| 6,807,095 B2 | 10/2004 | Chen et al. |
| 6,807,101 B2 | 10/2004 | Ooishi et al. |
| 6,809,964 B2 | 10/2004 | Moschopoulos et al. |
| 6,819,592 B2 | 11/2004 | Noguchi et al. |
| 6,829,167 B2 | 12/2004 | Tu et al. |
| 6,845,052 B1 | 1/2005 | Ho et al. |
| 6,851,018 B2 | 2/2005 | Wyatt et al. |
| 6,851,081 B2 | 2/2005 | Yamamoto |
| 6,856,546 B2 | 2/2005 | Guterman et al. |
| 6,862,218 B2 | 3/2005 | Guterman et al. |
| 6,870,767 B2 | 3/2005 | Rudelic et al. |
| 6,870,773 B2 | 3/2005 | Noguchi et al. |

| | | | |
|---|---|---|---|
| 6,873,552 B2 | 3/2005 | Ishii et al. |
| 6,879,520 B2 | 4/2005 | Hosono et al. |
| 6,882,567 B1 | 4/2005 | Wong |
| 6,894,926 B2 | 5/2005 | Guterman et al. |
| 6,907,497 B2 | 6/2005 | Hosono et al. |
| 6,925,009 B2 | 8/2005 | Noguchi et al. |
| 6,930,925 B2 | 8/2005 | Guo et al. |
| 6,934,188 B2 | 8/2005 | Roohparvar |
| 6,937,511 B2 | 8/2005 | Hsu et al. |
| 6,958,938 B2 | 10/2005 | Noguchi et al. |
| 6,963,505 B2 | 11/2005 | Cohen |
| 6,972,993 B2 | 12/2005 | Conley et al. |
| 6,988,175 B2 | 1/2006 | Lasser |
| 6,992,932 B2 | 1/2006 | Cohen |
| 6,999,344 B2 | 2/2006 | Hosono et al. |
| 7,002,843 B2 | 2/2006 | Guterman et al. |
| 7,006,379 B2 | 2/2006 | Noguchi et al. |
| 7,012,835 B2 | 3/2006 | Gonzales et al. |
| 7,020,017 B2 | 3/2006 | Chen et al. |
| 7,023,735 B2 | 4/2006 | Ban et al. |
| 7,031,210 B2 | 4/2006 | Park et al. |
| 7,031,214 B2 | 4/2006 | Tran |
| 7,031,216 B2 | 4/2006 | You |
| 7,039,846 B2 | 5/2006 | Hewitt et al. |
| 7,042,766 B1 | 5/2006 | Wang et al. |
| 7,054,193 B1 | 5/2006 | Wong |
| 7,054,199 B2 | 5/2006 | Lee et al. |
| 7,057,958 B2 | 6/2006 | So et al. |
| 7,065,147 B2 | 6/2006 | Ophir et al. |
| 7,068,539 B2 | 6/2006 | Guterman et al. |
| 7,071,849 B2 | 7/2006 | Zhang |
| 7,072,222 B2 | 7/2006 | Ishii et al. |
| 7,079,555 B2 | 7/2006 | Baydar et al. |
| 7,088,615 B2 | 8/2006 | Guterman et al. |
| 7,099,194 B2 | 8/2006 | Tu et al. |
| 7,102,924 B2 | 9/2006 | Chen et al. |
| 7,113,432 B2 | 9/2006 | Mokhlesi |
| 7,130,210 B2 | 10/2006 | Bathul et al. |
| 7,139,192 B1 | 11/2006 | Wong |
| 7,139,198 B2 | 11/2006 | Guterman et al. |
| 7,145,805 B2 | 12/2006 | Ishii et al. |
| 7,151,692 B2 | 12/2006 | Wu |
| 7,158,058 B1 | 1/2007 | Yu |
| 7,170,781 B2 | 1/2007 | So et al. |
| 7,170,802 B2 | 1/2007 | Cernea et al. |
| 7,173,859 B2 | 2/2007 | Hemink |
| 7,177,184 B2 | 2/2007 | Chen |
| 7,177,195 B2 | 2/2007 | Gonzales et al. |
| 7,177,199 B2 | 2/2007 | Chen et al. |
| 7,177,200 B2 | 2/2007 | Ronen et al. |
| 7,184,338 B2 | 2/2007 | Nakagawa et al. |
| 7,187,195 B2 | 3/2007 | Kim |
| 7,187,592 B2 | 3/2007 | Guterman et al. |
| 7,190,614 B2 | 3/2007 | Wu |
| 7,193,898 B2 | 3/2007 | Cernea |
| 7,193,921 B2 | 3/2007 | Choi et al. |
| 7,196,644 B1 | 3/2007 | Anderson et al. |
| 7,196,928 B2 | 3/2007 | Chen |
| 7,196,933 B2 | 3/2007 | Shibata |
| 7,197,594 B2 | 3/2007 | Raz et al. |
| 7,200,062 B2 | 4/2007 | Kinsely et al. |
| 7,210,077 B2 | 4/2007 | Brandenberger et al. |
| 7,221,592 B2 | 5/2007 | Nazarian |
| 7,224,613 B2 | 5/2007 | Chen et al. |
| 7,231,474 B1 | 6/2007 | Helms et al. |
| 7,231,562 B2 | 6/2007 | Ohlhoff et al. |
| 7,243,275 B2 | 7/2007 | Gongwer et al. |
| 7,254,690 B2 | 8/2007 | Rao |
| 7,254,763 B2 | 8/2007 | Aadsen et al. |
| 7,257,027 B2 | 8/2007 | Park |
| 7,259,987 B2 | 8/2007 | Chen et al. |
| 7,266,026 B2 | 9/2007 | Gongwer et al. |
| 7,266,069 B2 | 9/2007 | Chu |
| 7,269,066 B2 | 9/2007 | Nguyen et al. |
| 7,272,757 B2 | 9/2007 | Stocken |
| 7,274,611 B2 | 9/2007 | Roohparvar |
| 7,277,355 B2 | 10/2007 | Tanzana |
| 7,280,398 B1 | 10/2007 | Lee |
| 7,280,409 B2 | 10/2007 | Misumi et al. |
| 7,280,415 B2 | 10/2007 | Hwang et al. |
| 7,283,399 B2 | 10/2007 | Ishii et al. |
| 7,289,344 B2 | 10/2007 | Chen |
| 7,301,807 B2 | 11/2007 | Khalid et al. |
| 7,301,817 B2 | 11/2007 | Li et al. |
| 7,308,525 B2 | 12/2007 | Lasser et al. |
| 7,310,255 B2 | 12/2007 | Chan |
| 7,310,269 B2 | 12/2007 | Shibata |
| 7,310,271 B2 | 12/2007 | Lee |
| 7,310,272 B1 | 12/2007 | Mokhesi et al. |
| 7,310,347 B2 | 12/2007 | Lasser |
| 7,312,727 B1 | 12/2007 | Feng et al. |
| 7,321,509 B2 | 1/2008 | Chen et al. |
| 7,328,384 B1 | 2/2008 | Kulkarni et al. |
| 7,342,831 B2 | 3/2008 | Mokhlesi et al. |
| 7,343,330 B2 | 3/2008 | Boesjes et al. |
| 7,345,924 B2 | 3/2008 | Nguyen et al. |
| 7,345,928 B2 | 3/2008 | Li |
| 7,349,263 B2 | 3/2008 | Kim et al. |
| 7,356,755 B2 | 4/2008 | Fackenthal |
| 7,363,420 B2 | 4/2008 | Lin et al. |
| 7,365,671 B1 | 4/2008 | Anderson |
| 7,388,781 B2 | 6/2008 | Litsyn et al. |
| 7,397,697 B2 | 7/2008 | So et al. |
| 7,405,974 B2 | 7/2008 | Yaoi et al. |
| 7,405,979 B2 | 7/2008 | Ishii et al. |
| 7,408,804 B2 | 8/2008 | Hemink et al. |
| 7,408,810 B2 | 8/2008 | Aritome et al. |
| 7,409,473 B2 | 8/2008 | Conley et al. |
| 7,409,623 B2 | 8/2008 | Baker et al. |
| 7,420,847 B2 | 9/2008 | Li |
| 7,433,231 B2 | 10/2008 | Aritome |
| 7,433,697 B2 | 10/2008 | Karaoguz et al. |
| 7,434,111 B2 | 10/2008 | Sugiura et al. |
| 7,437,498 B2 | 10/2008 | Ronen |
| 7,440,324 B2 | 10/2008 | Mokhlesi |
| 7,440,331 B2 | 10/2008 | Hemink |
| 7,441,067 B2 | 10/2008 | Gorobetz et al. |
| 7,447,970 B2 | 11/2008 | Wu et al. |
| 7,450,421 B2 | 11/2008 | Mokhlesi et al. |
| 7,453,737 B2 | 11/2008 | Ha |
| 7,457,163 B2 | 11/2008 | Hemink |
| 7,457,897 B1 | 11/2008 | Lee et al. |
| 7,460,410 B2 | 12/2008 | Nagai et al. |
| 7,460,412 B2 | 12/2008 | Lee et al. |
| 7,466,592 B2 | 12/2008 | Mitani et al. |
| 7,468,907 B2 | 12/2008 | Kang et al. |
| 7,468,911 B2 | 12/2008 | Lutze et al. |
| 7,469,049 B1 | 12/2008 | Feng |
| 7,471,581 B2 | 12/2008 | Tran et al. |
| 7,483,319 B2 | 1/2009 | Brown |
| 7,487,329 B2 | 2/2009 | Hepkin et al. |
| 7,487,394 B2 | 2/2009 | Forhan et al. |
| 7,492,641 B2 | 2/2009 | Hosono et al. |
| 7,508,710 B2 | 3/2009 | Mokhlesi |
| 7,526,711 B2 | 4/2009 | Orio |
| 7,539,061 B2 | 5/2009 | Lee |
| 7,539,062 B2 | 5/2009 | Doyle |
| 7,551,492 B2 | 6/2009 | Kim |
| 7,558,109 B2 | 7/2009 | Brandman et al. |
| 7,558,839 B1 | 7/2009 | McGovern |
| 7,568,135 B2 | 7/2009 | Cornwell et al. |
| 7,570,520 B2 | 8/2009 | Kamei et al. |
| 7,574,555 B2 | 8/2009 | Porat et al. |
| 7,590,002 B2 | 9/2009 | Mokhlesi et al. |
| 7,593,259 B2 | 9/2009 | Kim et al. |
| 7,594,093 B2 | 9/2009 | Kancherla |
| 7,596,707 B1 | 9/2009 | Vemula |
| 7,609,787 B2 | 10/2009 | Jahan et al. |
| 7,613,043 B2 | 11/2009 | Cornwell et al. |
| 7,616,498 B2 | 11/2009 | Mokhlesi et al. |
| 7,619,918 B2 | 11/2009 | Aritome |
| 7,631,245 B2 | 12/2009 | Lasser |
| 7,633,798 B2 | 12/2009 | Sarin et al. |
| 7,633,802 B2 | 12/2009 | Mokhlesi |
| 7,639,532 B2 | 12/2009 | Roohparvar et al. |
| 7,644,347 B2 | 1/2010 | Alexander et al. |
| 7,656,734 B2 | 2/2010 | Thorp et al. |
| 7,660,158 B2 | 2/2010 | Aritome |

| | | |
|---|---|---|
| 7,660,183 B2 | 2/2010 | Ware et al. |
| 7,661,000 B2 | 2/2010 | Ueda et al. |
| 7,661,054 B2 | 2/2010 | Huffman et al. |
| 7,665,007 B2 | 2/2010 | Yang et al. |
| 7,680,987 B1 | 3/2010 | Clark et al. |
| 7,733,712 B1 | 6/2010 | Walston et al. |
| 7,742,351 B2 | 6/2010 | Inoue et al. |
| 7,761,624 B2 | 7/2010 | Karamcheti et al. |
| 7,797,609 B2 | 9/2010 | Neuman |
| 7,810,017 B2 | 10/2010 | Radke |
| 7,848,149 B2 | 12/2010 | Gonzales et al. |
| 7,869,273 B2 | 1/2011 | Lee et al. |
| 7,885,119 B2 | 2/2011 | Li |
| 7,904,783 B2 * | 3/2011 | Brandman et al. ............ 714/755 |
| 7,928,497 B2 | 4/2011 | Yaegashi |
| 7,929,549 B1 | 4/2011 | Talbot |
| 7,930,515 B2 | 4/2011 | Gupta et al. |
| 7,945,825 B2 | 5/2011 | Cohen et al. |
| 7,978,516 B2 | 7/2011 | Olbrich et al. |
| 8,014,094 B1 | 9/2011 | Jin |
| 8,037,380 B2 | 10/2011 | Cagno et al. |
| 8,040,744 B2 | 10/2011 | Gorobets et al. |
| 8,065,583 B2 * | 11/2011 | Radke ........................ 714/752 |
| 8,145,941 B2 * | 3/2012 | Jacobson .................... 714/6.24 |
| 2001/0002172 A1 | 5/2001 | Tanaka et al. |
| 2001/0006479 A1 | 7/2001 | Ikehashi et al. |
| 2002/0038440 A1 | 3/2002 | Barkan |
| 2002/0056064 A1 | 5/2002 | Kidorf et al. |
| 2002/0118574 A1 | 8/2002 | Gongwer et al. |
| 2002/0133684 A1 | 9/2002 | Anderson |
| 2002/0166091 A1 | 11/2002 | Kidorf et al. |
| 2002/0174295 A1 | 11/2002 | Ulrich et al. |
| 2002/0196510 A1 | 12/2002 | Hietala et al. |
| 2003/0002348 A1 | 1/2003 | Chen et al. |
| 2003/0103400 A1 | 6/2003 | Van Tran |
| 2003/0161183 A1 | 8/2003 | Van Tran |
| 2003/0189856 A1 | 10/2003 | Cho et al. |
| 2004/0057265 A1 | 3/2004 | Mirabel et al. |
| 2004/0057285 A1 | 3/2004 | Cernea et al. |
| 2004/0083333 A1 | 4/2004 | Chang et al. |
| 2004/0083334 A1 | 4/2004 | Chang et al. |
| 2004/0105311 A1 | 6/2004 | Cernea et al. |
| 2004/0114437 A1 | 6/2004 | Li |
| 2004/0160842 A1 | 8/2004 | Fukiage |
| 2004/0223371 A1 | 11/2004 | Roohparvar |
| 2005/0007802 A1 | 1/2005 | Gerpheide |
| 2005/0013165 A1 | 1/2005 | Ban |
| 2005/0024941 A1 | 2/2005 | Lasser et al. |
| 2005/0024978 A1 | 2/2005 | Ronen |
| 2005/0030788 A1 | 2/2005 | Parkinson et al. |
| 2005/0086574 A1 | 4/2005 | Fackenthal |
| 2005/0121436 A1 | 6/2005 | Kamitani et al. |
| 2005/0144361 A1 | 6/2005 | Gonzalez et al. |
| 2005/0157555 A1 | 7/2005 | Ono et al. |
| 2005/0162913 A1 | 7/2005 | Chen |
| 2005/0169051 A1 | 8/2005 | Khalid et al. |
| 2005/0189649 A1 | 9/2005 | Maruyama et al. |
| 2005/0213393 A1 | 9/2005 | Lasser |
| 2005/0224853 A1 | 10/2005 | Ohkawa |
| 2005/0240745 A1 | 10/2005 | Iyer et al. |
| 2005/0243626 A1 | 11/2005 | Ronen |
| 2006/0004952 A1 | 1/2006 | Lasser |
| 2006/0028875 A1 | 2/2006 | Avraham et al. |
| 2006/0028877 A1 | 2/2006 | Meir |
| 2006/0101193 A1 | 5/2006 | Murin |
| 2006/0106972 A1 | 5/2006 | Gorobets et al. |
| 2006/0107136 A1 | 5/2006 | Gongwer et al. |
| 2006/0129750 A1 | 6/2006 | Lee et al. |
| 2006/0133141 A1 | 6/2006 | Gorobets |
| 2006/0156189 A1 | 7/2006 | Tomlin |
| 2006/0179334 A1 | 8/2006 | Brittain et al. |
| 2006/0190699 A1 | 8/2006 | Lee |
| 2006/0203546 A1 | 9/2006 | Lasser |
| 2006/0218359 A1 | 9/2006 | Sanders et al. |
| 2006/0221692 A1 | 10/2006 | Chen |
| 2006/0221705 A1 | 10/2006 | Hemink et al. |
| 2006/0221714 A1 | 10/2006 | Li et al. |
| 2006/0239077 A1 | 10/2006 | Park et al. |
| 2006/0239081 A1 | 10/2006 | Roohparvar |
| 2006/0256620 A1 | 11/2006 | Nguyen et al. |
| 2006/0256626 A1 | 11/2006 | Werner et al. |
| 2006/0256891 A1 | 11/2006 | Yuan et al. |
| 2006/0271748 A1 | 11/2006 | Jain et al. |
| 2006/0285392 A1 | 12/2006 | Incarnati et al. |
| 2006/0285396 A1 | 12/2006 | Ha |
| 2007/0006013 A1 | 1/2007 | Moshayedi et al. |
| 2007/0019481 A1 | 1/2007 | Park |
| 2007/0033581 A1 | 2/2007 | Tomlin et al. |
| 2007/0047314 A1 | 3/2007 | Goda et al. |
| 2007/0047326 A1 | 3/2007 | Nguyen et al. |
| 2007/0050536 A1 | 3/2007 | Kolokowsky |
| 2007/0058446 A1 | 3/2007 | Hwang et al. |
| 2007/0061502 A1 | 3/2007 | Lasser et al. |
| 2007/0067667 A1 | 3/2007 | Ikeuchi et al. |
| 2007/0074093 A1 | 3/2007 | Lasser |
| 2007/0086239 A1 | 4/2007 | Litsyn et al. |
| 2007/0086260 A1 | 4/2007 | Sinclair |
| 2007/0089034 A1 | 4/2007 | Litsyn et al. |
| 2007/0091677 A1 | 4/2007 | Lasser et al. |
| 2007/0091694 A1 | 4/2007 | Lee et al. |
| 2007/0103978 A1 | 5/2007 | Conley et al. |
| 2007/0103986 A1 | 5/2007 | Chen |
| 2007/0104211 A1 | 5/2007 | Opsasnick |
| 2007/0109845 A1 | 5/2007 | Chen |
| 2007/0109849 A1 | 5/2007 | Chen |
| 2007/0115726 A1 | 5/2007 | Cohen et al. |
| 2007/0118713 A1 | 5/2007 | Guterman et al. |
| 2007/0143378 A1 | 6/2007 | Gorobetz |
| 2007/0143531 A1 | 6/2007 | Atri |
| 2007/0159889 A1 | 7/2007 | Kang et al. |
| 2007/0159892 A1 | 7/2007 | Kang et al. |
| 2007/0159907 A1 | 7/2007 | Kwak |
| 2007/0168837 A1 | 7/2007 | Murin |
| 2007/0171714 A1 * | 7/2007 | Wu et al. ................. 365/185.09 |
| 2007/0183210 A1 | 8/2007 | Choi et al. |
| 2007/0189073 A1 | 8/2007 | Aritome |
| 2007/0195602 A1 | 8/2007 | Fong et al. |
| 2007/0206426 A1 | 9/2007 | Mokhlesi |
| 2007/0208904 A1 | 9/2007 | Hsieh et al. |
| 2007/0226599 A1 | 9/2007 | Motwani |
| 2007/0236990 A1 | 10/2007 | Aritome |
| 2007/0253249 A1 | 11/2007 | Kang et al. |
| 2007/0256620 A1 | 11/2007 | Viggiano et al. |
| 2007/0263455 A1 | 11/2007 | Cornwell et al. |
| 2007/0266232 A1 | 11/2007 | Rodgers et al. |
| 2007/0271424 A1 | 11/2007 | Lee et al. |
| 2007/0280000 A1 | 12/2007 | Fujiu et al. |
| 2007/0291571 A1 | 12/2007 | Balasundaram |
| 2007/0297234 A1 | 12/2007 | Cernea et al. |
| 2008/0010395 A1 | 1/2008 | Mylly et al. |
| 2008/0025121 A1 | 1/2008 | Tanzawa |
| 2008/0043535 A1 | 2/2008 | Roohparvar |
| 2008/0049504 A1 | 2/2008 | Kasahara et al. |
| 2008/0049506 A1 | 2/2008 | Guterman |
| 2008/0052446 A1 | 2/2008 | Lasser et al. |
| 2008/0055993 A1 | 3/2008 | Lee |
| 2008/0080243 A1 | 4/2008 | Edahiro et al. |
| 2008/0082730 A1 | 4/2008 | Kim et al. |
| 2008/0089123 A1 | 4/2008 | Chae et al. |
| 2008/0104309 A1 | 5/2008 | Cheon et al. |
| 2008/0104312 A1 | 5/2008 | Lasser |
| 2008/0109590 A1 | 5/2008 | Jung et al. |
| 2008/0115017 A1 * | 5/2008 | Jacobson ..................... 714/710 |
| 2008/0123420 A1 | 5/2008 | Brandman et al. |
| 2008/0123426 A1 | 5/2008 | Lutze et al. |
| 2008/0126686 A1 | 5/2008 | Sokolov et al. |
| 2008/0130341 A1 | 6/2008 | Shalvi et al. |
| 2008/0148115 A1 | 6/2008 | Sokolov et al. |
| 2008/0151618 A1 | 6/2008 | Sharon et al. |
| 2008/0151667 A1 | 6/2008 | Miu et al. |
| 2008/0158958 A1 | 7/2008 | Sokolov et al. |
| 2008/0181001 A1 | 7/2008 | Shalvi |
| 2008/0198650 A1 | 8/2008 | Shalvi et al. |
| 2008/0198654 A1 | 8/2008 | Toda |
| 2008/0209116 A1 | 8/2008 | Caulkins |
| 2008/0209304 A1 | 8/2008 | Winarski et al. |
| 2008/0215798 A1 | 9/2008 | Sharon et al. |
| 2008/0219050 A1 | 9/2008 | Shalvi et al. |

| | | |
|---|---|---|
| 2008/0239093 A1 | 10/2008 | Easwar et al. |
| 2008/0239812 A1 | 10/2008 | Abiko et al. |
| 2008/0253188 A1 | 10/2008 | Aritome |
| 2008/0263262 A1 | 10/2008 | Sokolov et al. |
| 2008/0263676 A1 | 10/2008 | Mo et al. |
| 2008/0270730 A1 | 10/2008 | Lasser et al. |
| 2008/0282106 A1 | 11/2008 | Shalvi et al. |
| 2008/0288714 A1 | 11/2008 | Salomon et al. |
| 2009/0013233 A1* | 1/2009 | Radke .............. 714/752 |
| 2009/0024905 A1 | 1/2009 | Shalvi et al. |
| 2009/0034337 A1 | 2/2009 | Aritome |
| 2009/0043831 A1 | 2/2009 | Antonopoulos et al. |
| 2009/0043951 A1 | 2/2009 | Shalvi et al. |
| 2009/0049234 A1 | 2/2009 | Oh et al. |
| 2009/0073762 A1 | 3/2009 | Lee et al. |
| 2009/0086542 A1 | 4/2009 | Lee et al. |
| 2009/0089484 A1 | 4/2009 | Chu |
| 2009/0091979 A1 | 4/2009 | Shalvi |
| 2009/0094930 A1 | 4/2009 | Schwoerer |
| 2009/0106485 A1 | 4/2009 | Anholt |
| 2009/0112949 A1 | 4/2009 | Ergan et al. |
| 2009/0132755 A1* | 5/2009 | Radke .............. 711/103 |
| 2009/0144600 A1 | 6/2009 | Perlmutter et al. |
| 2009/0150894 A1 | 6/2009 | Huang et al. |
| 2009/0157950 A1 | 6/2009 | Selinger |
| 2009/0157964 A1 | 6/2009 | Kasorla et al. |
| 2009/0158126 A1 | 6/2009 | Perlmutter et al. |
| 2009/0168524 A1 | 7/2009 | Golov et al. |
| 2009/0172257 A1 | 7/2009 | Prins et al. |
| 2009/0172261 A1 | 7/2009 | Prins et al. |
| 2009/0193184 A1 | 7/2009 | Yu et al. |
| 2009/0199074 A1 | 8/2009 | Sommer et al. |
| 2009/0204824 A1 | 8/2009 | Lin et al. |
| 2009/0204872 A1 | 8/2009 | Yu et al. |
| 2009/0213653 A1 | 8/2009 | Perlmutter et al. |
| 2009/0213654 A1 | 8/2009 | Perlmutter et al. |
| 2009/0225595 A1 | 9/2009 | Kim |
| 2009/0228761 A1 | 9/2009 | Perlmutter et al. |
| 2009/0240872 A1 | 9/2009 | Perlmutter et al. |
| 2009/0265509 A1 | 10/2009 | Klein |
| 2009/0300227 A1 | 12/2009 | Nochimowski et al. |
| 2009/0323412 A1 | 12/2009 | Mokhlesi et al. |
| 2009/0327608 A1 | 12/2009 | Eschmann |
| 2010/0017650 A1 | 1/2010 | Chin et al. |
| 2010/0034022 A1 | 2/2010 | Dutta et al. |
| 2010/0057976 A1 | 3/2010 | Lasser |
| 2010/0061151 A1 | 3/2010 | Miwa et al. |
| 2010/0082883 A1 | 4/2010 | Chen et al. |
| 2010/0083247 A1 | 4/2010 | Kanevsky et al. |
| 2010/0110580 A1 | 5/2010 | Takashima |
| 2010/0131697 A1 | 5/2010 | Alrod et al. |
| 2010/0142268 A1 | 6/2010 | Aritome |
| 2010/0142277 A1 | 6/2010 | Yang et al. |
| 2010/0169547 A1 | 7/2010 | Ou |
| 2010/0169743 A1 | 7/2010 | Vogan et al. |
| 2010/0174847 A1 | 7/2010 | Paley et al. |
| 2010/0211803 A1 | 8/2010 | Lablans |
| 2010/0287217 A1 | 11/2010 | Borchers et al. |
| 2011/0010489 A1 | 1/2011 | Yeh |
| 2011/0060969 A1* | 3/2011 | Ramamoorthy et al. ..... 714/773 |
| 2011/0066793 A1 | 3/2011 | Burd |
| 2011/0075482 A1 | 3/2011 | Shepard et al. |
| 2011/0107049 A1 | 5/2011 | Kwon et al. |
| 2011/0149657 A1 | 6/2011 | Haratsch et al. |
| 2011/0199823 A1 | 8/2011 | Bar-Or et al. |
| 2011/0302354 A1 | 12/2011 | Miller |

FOREIGN PATENT DOCUMENTS

| | | |
|---|---|---|
| EP | 1434236 B1 | 6/2004 |
| EP | 1605509 A1 | 12/2005 |
| WO | 9610256 A1 | 4/1996 |
| WO | 9828745 A1 | 7/1998 |
| WO | 02100112 A1 | 12/2002 |
| WO | 03100791 A1 | 12/2003 |
| WO | 2007046084 A2 | 4/2007 |
| WO | 2007132452 A2 | 11/2007 |
| WO | 2007132453 A2 | 11/2007 |
| WO | 2007132456 A2 | 11/2007 |
| WO | 2007132457 A2 | 11/2007 |
| WO | 2007132458 A2 | 11/2007 |
| WO | 2007146010 A2 | 12/2007 |
| WO | 2008026203 A2 | 3/2008 |
| WO | 2008053472 A2 | 5/2008 |
| WO | 2008053473 A2 | 5/2008 |
| WO | 2008068747 A2 | 6/2008 |
| WO | 2008077284 A1 | 7/2008 |
| WO | 2008083131 A2 | 7/2008 |
| WO | 2008099958 A1 | 8/2008 |
| WO | 2008111058 A2 | 9/2008 |
| WO | 2008124760 A2 | 10/2008 |
| WO | 2008139441 A2 | 11/2008 |
| WO | 2009037691 A2 | 3/2009 |
| WO | 2009037697 A2 | 3/2009 |
| WO | 2009038961 A2 | 3/2009 |
| WO | 2009050703 A2 | 4/2009 |
| WO | 2009053961 A2 | 4/2009 |
| WO | 2009053962 A2 | 4/2009 |
| WO | 2009053963 A2 | 4/2009 |
| WO | 2009063450 A2 | 5/2009 |
| WO | 2009072100 A2 | 6/2009 |
| WO | 2009072101 A2 | 6/2009 |
| WO | 2009072102 A2 | 6/2009 |
| WO | 2009072103 A2 | 6/2009 |
| WO | 2009072104 A2 | 6/2009 |
| WO | 2009072105 A2 | 6/2009 |
| WO | 2009074978 A2 | 6/2009 |
| WO | 2009074979 A2 | 6/2009 |
| WO | 2009078006 A2 | 6/2009 |
| WO | 2009095902 A2 | 8/2009 |
| WO | 2011024015 A1 | 3/2011 |

OTHER PUBLICATIONS

Panchbhai et al., "Improving Reliability of NAND Based Flash Memory Using Hybrid SLC/MLC Device", Project Proposal for CSci 8980—Advanced Storage Systems, University of Minnesota, USA, Spring 2009.

U.S. Appl. No. 11/957,970 Official Action dated May 20, 2010.

Shalvi et al., U.S. Appl. No. 12/822,207 "Adaptive Over-Provisioning in Memory Systems" filed Jun. 24, 2010.

Agrell et al., "Closest Point Search in Lattices", IEEE Transactions on Information Theory, vol. 48, No. 8, pp. 2201-2214, Aug. 2002.

Bez et al., "Introduction to Flash memory", Proceedings of the IEEE, vol. 91, No. 4, pp. 489-502, Apr. 2003.

Blahut, R.E., "Theory and Practice of Error Control Codes," Addison-Wesley, May, 1984, section 3.2, pp. 47-48.

Chang, L., "Hybrid Solid State Disks: Combining Heterogeneous NAND Flash in Large SSDs", ASPDAC, Jan. 2008.

Cho et al., "Multi-Level NAND Flash Memory with Non-Uniform Threshold Voltage Distribution," IEEE International Solid-State Circuits Conference (ISSCC), San Francisco, CA, Feb. 5-7, 2001, pp. 28-29 and 424.

Databahn™, "Flash memory controller IP", Denali Software, Inc., 1994 https://www.denali.com/en/products/databahn_flash.jsp.

Datalight, Inc., "FlashFX Pro 3.1 High Performance Flash Manager for Rapid Development of Reliable Products", Nov. 16, 2006.

Duann, N., Silicon Motion Presentation "SLC & MLC Hybrid", Flash Memory Summit, Santa Clara, USA, Aug. 2008.

Eitan et al., "Can NROM, a 2-bit, Trapping Storage NVM Cell, Give a Real Challenge to Floating Gate Cells?", Proceedings of the 1999 International Conference on Solid State Devices and Materials (SSDM), p. 522-524, Tokyo, Japan 1999.

Eitan et al., "Multilevel Flash Cells and their Trade-Offs", Proceedings of the 1996 IEEE International Electron Devices Meeting (IEDM), pp. 169-172, New York, USA 1996.

Engh et al., "A self adaptive programming method with 5 mV accuracy for multi-level storage in FLASH", pp. 115-118, Proceedings of the IEEE 2002 Custom Integrated Circuits Conference, May 12-15, 2002.

Goodman et al., "On-Chip ECC for Multi-Level Random Access Memories," Proceedings of the IEEE/CAM Information Theory Workshop, Ithaca, USA, Jun. 25-29, 1989.

Han et al., "An Intelligent Garbage Collection Algorithm for Flash Memory Storages", Computational Science and Its Applications—

ICCSA 2006, vol. 3980/2006, pp. 1019-1027, Springer Berlin/Heidelberg, Germany, May 11, 2006.
Han et al., "CATA: A Garbage Collection Scheme for Flash Memory File Systems", Ubiquitous Intelligence and Computing, vol. 4159/2006, pp. 103-112, Springer Berlin/Heidelberg, Aug. 25, 2006.
Horstein, "On the Design of Signals for Sequential and Nonsequential Detection Systems with Feedback," IEEE Transactions on Information Theory IT-12:4 (Oct. 1966), pp. 448-455.
Jung et al., in "A 117 mm.sup.2 3.3V Only 128 Mb Multilevel NAND Flash Memory for Mass Storage Applications," IEEE Journal of Solid State Circuits, (11:31), Nov. 1996, pp. 1575-1583.
Kawaguchi et al. 1995. A flash-memory based file system. In Proceedings of the USENIX 1995 Technical Conference, New Orleans, Louisiana. 155-164.
Kim et al., "Future Memory Technology including Emerging New Memories", Proceedings of the 24th International Conference on Microelectronics (MIEL), vol. 1, pp. 377-384, Nis, Serbia and Montenegro, May 16-19, 2004.
Lee et al., "Effects of Floating Gate Interference on NAND Flash Memory Cell Operation", IEEE Electron Device Letters, vol. 23, No. 5, pp. 264-266, May 2002.
Maayan et al., "A 512 Mb NROM Flash Data Storage Memory with 8 MB/s Data Rate", Proceedings of the 2002 IEEE International Solid-State circuits Conference (ISSCC 2002), pp. 100-101, San Francisco, USA, Feb. 3-7, 2002.
Mielke et al., "Recovery Effects in the Distributed Cycling of Flash Memories", IEEE 44th Annual International Reliability Physics Symposium, pp. 29-35, San Jose, USA, Mar. 2006.
Onfi, "Open NAND Flash Interface Specification," revision 1.0, Dec. 28, 2006.
Phison Electronics Corporation, "PS8000 Controller Specification (for SD Card)", revision 1.2, Document No. S-07018, Mar. 28, 2007.
Shalvi, et al., "Signal Codes," Proceedings of the 2003 IEEE Information Theory Workshop (ITW' 2003), Paris, France, Mar. 31-Apr. 4, 2003.
Shiozaki, A., "Adaptive Type-II Hybrid Broadcast ARQ System", IEEE Transactions on Communications, vol. 44, Issue 4, pp. 420-422, Apr. 1996.
Suh et al., "A 3.3V 32Mb NAND Flash Memory with Incremental Step Pulse Programming Scheme", IEEE Journal of Solid-State Circuits, vol. 30, No. 11, pp. 1149-1156, Nov. 1995.
ST Microelectronics, "Bad Block Management in NAND Flash Memories", Application note AN-1819, Geneva, Switzerland, May 2004.
ST Microelectronics, "Wear Leveling in Single Level Cell NAND Flash Memories," Application note AN-1822 Geneva, Switzerland, Feb. 2007.
Takeuchi et al., "A Double Level $V_{TH}$ Select Gate Array Architecture for Multi-Level NAND Flash Memories", Digest of Technical Papers, 1995 Symposium on VLSI Circuits, pp. 69-70, Jun. 8-10, 1995.
Wu et al., "eNVy: A non-Volatile, Main Memory Storage System", Proceedings of the 6th International Conference on Architectural support for programming languages and operating systems, pp. 86-87, San Jose, USA, 1994.
International Application PCT/IL2007/000575 Patentability report dated Mar. 26, 2009.
International Application PCT/IL2007/000575 Search Report dated May 30, 2008.
International Application PCT/IL2007/000576 Patentability Report dated Mar. 19, 2009.
International Application PCT/IL2007/000576 Search Report dated Jul. 7, 2008.
International Application PCT/IL2007/000579 Patentability report dated Mar. 10, 2009.
International Application PCT/IL2007/000579 Search report dated Jul. 3, 2008.
International Application PCT/IL2007/000580 Patentability Report dated Mar. 10, 2009.
International Application PCT/IL2007/000580 Search Report dated Sep. 11, 2008.
International Application PCT/IL2007/000581 Patentability Report dated Mar. 26, 2009.
International Application PCT/IL2007/000581 Search Report dated Aug 25, 2008.
International Application PCT/IL2007/001059 Patentability report dated Apr. 19, 2009.
International Application PCT/IL2007/001059 Search report dated Aug. 7, 2008.
International Application PCT/IL2007/001315 search report dated Aug. 7, 2008.
International Application PCT/IL2007/001315 Patentability Report dated May 5, 2009.
International Application PCT/IL2007/001316 Search report dated Jul. 22, 2008.
International Application PCT/IL2007/001316 Patentability Report dated May 5, 2009.
International Application PCT/IL2007/001488 Search report dated Jun. 20, 2008.
International Application PCT/IL2008/000329 Search report dated Nov. 25, 2008.
International Application PCT/IL2008/000519 Search report dated Nov. 20, 2008.
International Application PCT/IL2008/001188 Search Report dated Jan. 28, 2009.
International Application PCT/IL2008/001356 Search Report dated Feb. 3, 2009.
International Application PCT/IL2008/001446 Search report dated Feb. 20, 2009.
U.S. Appl. No. 11/949,135 Official Action dated Oct. 2, 2009.
Sommer, N., U.S. Appl. No. 12/171,797 "Memory Device with Non-Uniform Programming Levels" filed Jul. 11, 2008.
Shalvi et al., U.S. Appl. No. 12/251,471 "Compensation for Voltage Drifts in Analog Memory Cells" filed Oct. 15, 2008.
Sommer et al., U.S. Appl. No. 12/497,707 "Data Storage in Analog Memory Cells with Protection Against Programming Interruption" filed Jul. 6, 2009.
Winter et al., U.S. Appl. No. 12/534,898 "Data Storage Using Modified Voltages" filed Aug. 4, 2009.
Winter et al., U.S. Appl. No. 12/534,893 "Improved Data Storage in Analog Memory Cells Using Modified Pass Voltages" filed Aug. 4, 2009.
Shalvi et al., U.S. Appl. No. 12/551,583 "Segmented Data Storage" filed Sep. 1, 2009.
Shalvi et al., U.S. Appl. No. 12/551,567 "Reliable Data Storage in Analog Memory Cells Subjected to Long Retention Periods" filed Sep. 1, 2009.
Perlmutter et al., U.S. Appl. No. 12/558,528 "Estimation of Memory Cell Read Thresholds by Sampling Inside Programming Level Distribution Intervals" filed Sep. 13, 2009.
Sokolov, D., U.S. Appl. No. 12/579,430 "Efficient Programming of Analog Memory Cell Devices", filed Oct. 15, 2009.
U.S. Appl. No. 12/880,101 "Reuse of Host Hibernation Storage Space by Memory Controller", filed Sep. 12, 2010.
U.S. Appl. No. 12/890,724 "Error Correction Coding Over Multiple Memory Pages", filed Sep. 27, 2010.
U.S. Appl. No. 12/171,797 Official Action dated Aug. 25, 2010.
U.S. Appl. No. 12/497,707 Official Action dated Sep. 15, 2010.
U.S. Appl. No. 11/995,801 Official Action dated Oct. 15, 2010.
Numonyx, "M25PE16: 16-Mbit, page-erasable serial flash memory with byte-alterability, 75 MHz SPI bus, standard pinout", Apr. 2008.
U.S. Appl. No. 12/019,011 Official Action dated Nov. 20, 2009.
Takeuchi et al., "A Multipage Cell Architecture for High-Speed Programming Multilevel NAND Flash Memories", IEEE Journal of Solid State Circuits, vol. 33, No. 8, Aug. 1998.
U.S. Appl. No. 12/534,898 Official Action dated Mar. 23, 2011.
U.S. Appl. No. 13/047,822, filed Mar. 15, 2011.
U.S. Appl. No. 13/069,406, filed Mar. 23, 2011.
U.S. Appl. No. 13/088,361, filed Apr. 17, 2011.
JEDEC Standard JESD84-C44, "Embedded MultiMediaCard (e•MMC) Mechanical Standard, with Optional Reset Signal", Jedec Solid State Technology Association, USA, Jul. 2009.
JEDEC, "UFS Specification", version 0.1, Nov. 11, 2009.
SD Group and SD Card Association, "SD Specifications Part 1 Physical Layer Specification", version 3.01, draft 1.00, Nov. 9, 2009.

Compaq et al., "Universal Serial Bus Specification", revision 2.0, Apr. 27, 2000.

Serial ATA International Organization, "Serial ATA Revision 3.0 Specification", Jun. 2, 2009.

Gotou, H., "An Experimental Confirmation of Automatic Threshold Voltage Convergence in a Flash Memory Using Alternating Word-Line Voltage Pulses", IEEE Electron Device Letters, vol. 18, No. 10, pp. 503-505, Oct. 1997.

Hong et al., "NAND Flash-based Disk Cache Using SLC/MLC Combined Flash Memory", 2010 International Workshop on Storage Network Architecture and Parallel I/Os, pp. 21-30, USA, May 3, 2010.

U.S. Appl. No. 11/945,575 Official Action dated Aug. 24, 2010.

U.S. Appl. No. 12/045,520 Official Action dated Nov. 16, 2010.

Wei, L., "Trellis-Coded Modulation With Multidimensional Constellations", IEEE Transactions on Information Theory, vol. IT-33, No. 4, pp. 483-501, Jul. 1987.

U.S. Appl. No. 13/114,049 Official Action dated Sep. 12, 2011.

U.S. Appl. No. 12/405,275 Official Action dated Jul. 29, 2011.

Conway et al., "Sphere Packings, Lattices and Groups", 3rd edition, chapter 4, pp. 94-135, Springer, New York, USA 1998.

Chinese Patent Application # 200780040493.X Official Action dated Jun. 15, 2011.

U.S. Appl. No. 12/037,487 Official Action dated Oct. 3, 2011.

U.S. Appl. No. 12/649,360 Official Action dated Aug. 9, 2011.

U.S. Appl. No. 13/192,504, filed Jul. 28, 2011.

U.S. Appl. No. 13/192,852, filed Aug. 2, 2011.

U.S. Appl. No. 13/231,963, filed Sep. 14, 2011.

U.S. Appl. No. 13/239,408, filed Sep. 22, 2011.

U.S. Appl. No. 13/239,411, filed Sep. 22, 2011.

U.S. Appl. No. 13/214,257, filed Aug. 22, 2011.

U.S. Appl. No. 13/192,501, filed Jul. 28, 2011.

U.S. Appl. No. 13/192,495, filed Jul. 28, 2011.

U.S. Appl. No. 11/995,814 Official Action dated Dec. 17, 2010.

U.S. Appl. No. 12/388,528 Official Action dated Nov. 29, 2010.

U.S. Appl. No. 12/251,471 Official Action dated Jan. 3, 2011.

Engineering Windows 7, "Support and Q&A for Solid-State Drives", e7blog, May 5, 2009.

Micron Technology Inc., "Memory Management in NAND Flash Arrays", Technical Note, year 2005.

Kang et al., "A Superblock-based Flash Translation Layer for NAND Flash Memory", Proceedings of the 6th ACM & IEEE International Conference on Embedded Software, pp. 161-170, Seoul, Korea, Oct. 22-26, 2006.

Park et al., "Sub-Grouped Superblock Management for High-Performance Flash Storages", IEICE Electronics Express, vol. 6, No. 6, pp. 297-303, Mar. 25, 2009.

"How to Resolve "Bad Super Block: Magic Number Wrong" in BSD", Free Online Articles Director Article Base, posted Sep. 5, 2009.

Ubuntu Forums, "Memory Stick Failed IO Superblock", posted Nov. 11, 2009.

Super User Forums, "SD Card Failure, can't read superblock", posted Aug. 8, 2010.

U.S. Appl. No. 12/987,174 "Redundant Data Storage in Multi-Die Memory Systems", filed Jan. 10, 2011.

U.S. Appl. No. 12/987,175 "Redundant Data Storage Schemes for Multi-Die Memory Systems" filed Jan. 10, 2011.

U.S. Appl. No. 12/963,649 "Memory Management Schemes for Non-Volatile Memory Devices" filed Dec. 9, 2010.

U.S. Appl. No. 13/021,754 "Reducing Peak Current in Memory Systems" filed Feb. 6, 2011.

Ankolekar et al., "Multibit Error-Correction Methods for Latency-Constrained Flash Memory Systems", IEEE Transactions on Device and Materials Reliability, vol. 10, No. 1, pp. 33-39, Mar. 2010.

U.S. Appl. No. 12/344,233 Official Action dated Jun. 24, 2011.

U.S. Appl. No. 11/995,813 Official Action dated Jun. 16, 2011.

Berman et al., "Mitigating Inter-Cell Coupling Effects in MLC NAND Flash via Constrained Coding", Flash Memory Summit, Santa Clara, USA, Aug. 19, 2010.

U.S. Appl. No. 12/178,318 Official Action dated May 31, 2011.

CN Patent Application # 200780026181.3 Official Action dated Apr. 8, 2011.

U.S. Appl. No. 12/323,544 Office Action dated Dec. 13, 2011.

U.S. Appl. No. 12/332,368 Office Action dated Nov. 10, 2011.

U.S. Appl. No. 12/063,544 Office Action dated Dec. 14, 2011.

U.S. Appl. No. 12/186,867 Office Action dated Jan. 17, 2012.

U.S. Appl. No. 12/119,069 Office Action dated Nov. 14, 2011.

U.S. Appl. No. 12/037,487 Office Action dated Jan. 3, 2012.

U.S. Appl. No. 11/995,812 Office Action dated Oct. 28, 2011.

U.S. Appl. No. 12/551,567 Office Action dated Oct. 27, 2011.

U.S. Appl. No. 12/618,732 Office Action dated Nov. 4, 2011.

U.S. Appl. No. 12/649,382 Office Action dated Jan. 6, 2012.

U.S. Appl. No. 13/284,909, filed Oct. 30, 2011.

U.S. Appl. No. 13/284,913, filed Oct. 30, 2011.

U.S. Appl. No. 13/338,335, filed Dec. 28, 2011.

U.S. Appl. No. 13/355,536, filed Jan. 22, 2012.

Kim et al., "Multi-bit Error Tolerant Caches Using Two-Dimensional Error Coding", Proceedings of the 40th Annual ACM/IEEE International Symposium on Microarchitecture (MICRO-40), Chicago, USA, Dec. 1-5, 2007.

U.S. Appl. No. 12/323,544 Official Action dated Mar. 9, 2012.

Chinese Patent Application No. 200780026181.3 Official Action dated Mar. 7, 2012.

Chinese Patent Application No. 200780026094.8 Official Action dated Feb. 2, 2012.

U.S. Appl. No. 12/332,370 Official Action dated Mar. 8, 2012.

SAS Protocol, "Information Technology—Serial Attached SCSI—2 (SAS-2)", INCITS document T10/1760-D, revision 15a, Feb. 22, 2009.

U.S. Appl. No. 12/522,175 Official Action dated Mar. 27, 2012.

U.S. Appl. No. 12/607,085 Official Action dated Mar. 28, 2012.

Budilovsky et al., "Prototyping a High-Performance Low-Cost Solid-State Disk", SYSTOR—The 4th Annual International Systems and Storage Conference, Haifa, Israel, May 30-Jun. 1, 2011.

NVM Express Protocol, "NVM Express", Revision 1.0b, Jul. 12, 2011.

SCSI Protocol, "Information Technology—SCSI Architecture Model—5 (SAM-5)", INCITS document T10/2104-D, revision 01, Jan. 28, 2009.

US 7,161,836, 01/2007, Wan et al. (withdrawn)

* cited by examiner

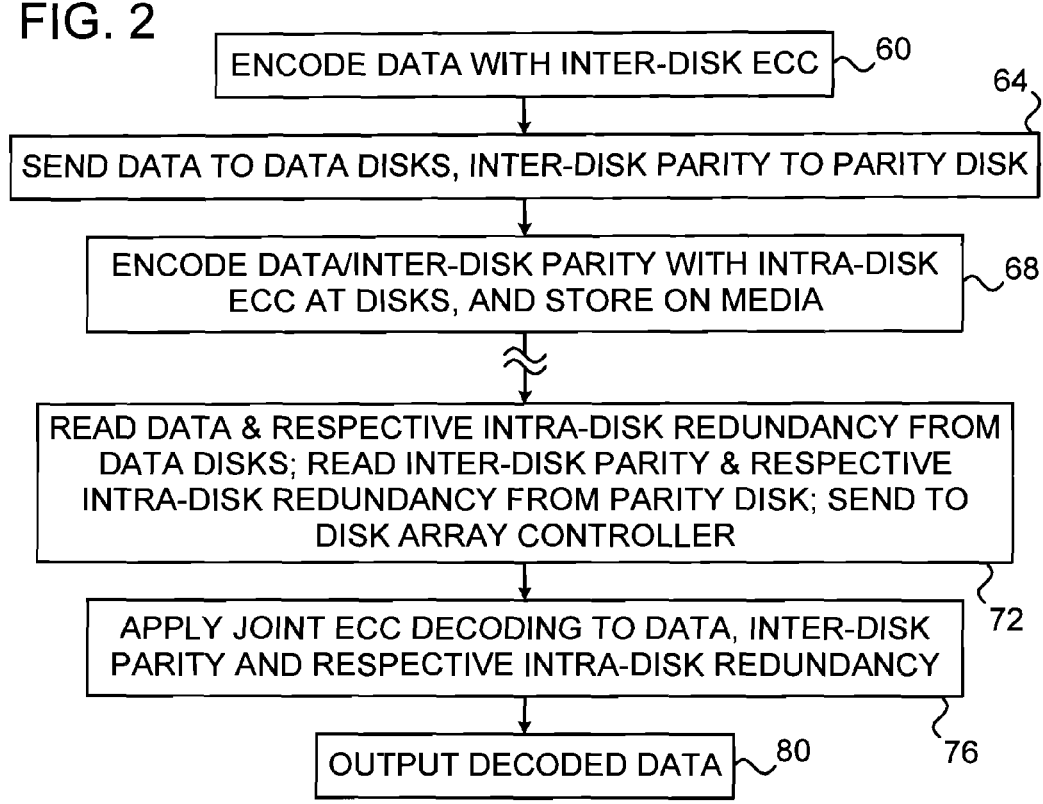
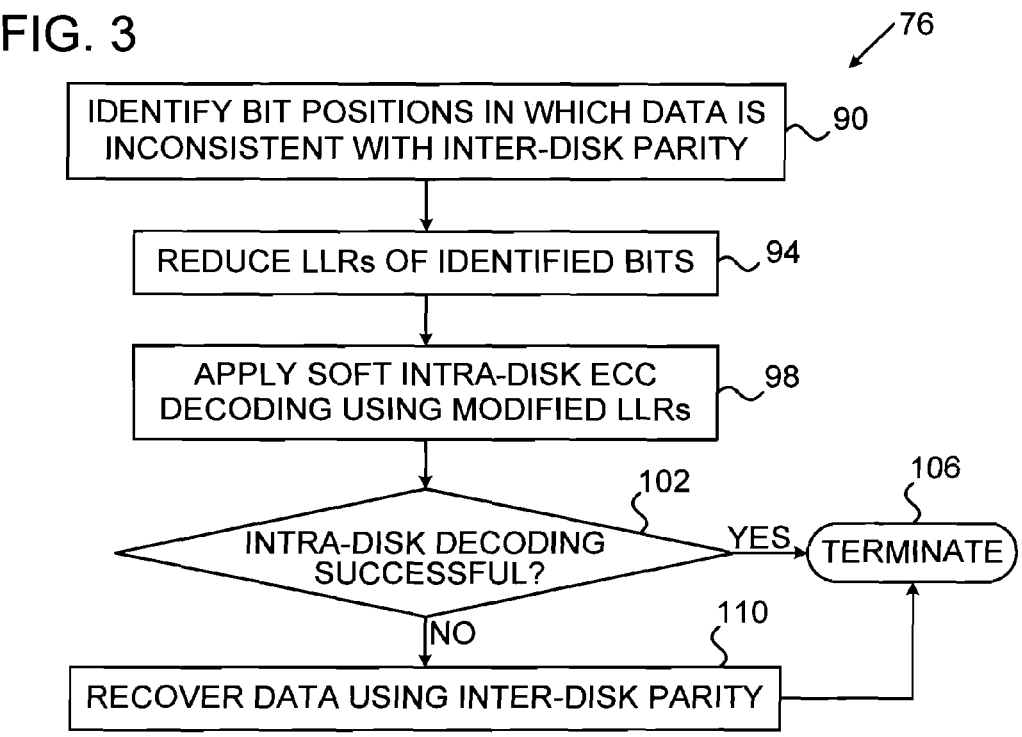

US 8,239,734 B1

EFFICIENT DATA STORAGE IN STORAGE DEVICE ARRAYS

CROSS-REFERENCE TO RELATED APPLICATIONS

This application claims the benefit of U.S. Provisional Patent Application 61/105,580, filed Oct. 15, 2008, whose disclosure is incorporated herein by reference.

FIELD OF THE INVENTION

The present invention relates generally to data storage, and particularly to methods and systems for storing data in storage device arrays.

BACKGROUND OF THE INVENTION

Various data storage systems employ multiple storage devices, such as Hard Disk Drives (HDD), Solid State Disks (SSD) or solid-state memory devices, for storing data. Several techniques have been developed for storing data reliably, and for recovering from storage device failures. For example, Redundant Array of Inexpensive Disks (RAID) is a family of storage schemes, which store data redundantly and enable recovery from a failure of one or more of the storage devices.

As another example, U.S. Patent Application Publication 2008/0115017, whose disclosure is incorporated herein by reference, describes fault-tolerant, redundancy-based data-storage systems. These techniques use disk-controller-implemented error detection and error correction, at the disk-block level, and RAID-controller-implemented data-redundancy methods, at the disk and disk-stripe level, in order to provide error detection and error correction.

U.S. Patent Application Publication 2002/0174295, whose disclosure is incorporated herein by reference, describes a file system that includes a plurality of disk drives for storing parity groups, each parity group comprising storage blocks. The storage blocks include one or more data blocks and a parity block associated with the data blocks. Each of the storage blocks is stored on a separate disk drive such that no two storage blocks from a given parity group reside on the same disk drive. A recovery module dynamically recovers data lost when a disk drive becomes unavailable. The recovery module produces a reconstructed block by using information in the remaining storage blocks of a parity group corresponding to an unavailable storage block, and stores the reconstructed block on a functioning drive.

U.S. Patent Application Publication 2008/0209304, whose disclosure is incorporated herein by reference, describes a redundant array of independent devices, which uses convolution encoding to provide redundancy of the striped data written to the devices. No parity is utilized in the convolution encoding process. Trellis decoding is used for both reading the data from the array and for rebuilding missing encoded data from one or more failed devices, based on a minimal, and preferably zero, Hamming distance for selecting the connected path through the trellis diagram.

SUMMARY OF THE INVENTION

An embodiment of the present invention provides a method for data storage, including:

encoding data with an inter-device Error Correction Code (ECC), and sending the encoded data for storage on two or more storage devices;

encoding the data to be stored on each of the storage devices, and which has been encoded with the inter-device ECC, with an intra-device ECC, and storing the data encoded with the inter-device and intra-device ECCs on the storage device;

after storing the data, retrieving and outputting at least part of the stored data by decoding the intra-device and inter-device ECCs, while using information related to one of the intra-device and inter-device ECCs in decoding the other of the intra-device and inter-device ECCs.

In some embodiments, the storage devices include at least one device type selected from a group of types consisting of a magnetic disk, a Solid State Disk (SSD), a Direct Access Storage Device (DASD), a solid state memory device, a memory chip, a Multi-Chip Package (MCP) memory device and a disk sub-array. In an embodiment, the information is related to the inter-device ECC, and retrieving the at least part of the data includes making an attempt to decode the intra-device ECC independently of the information, and decoding the intra-device ECC using the information responsively to a failure of the attempt. In another embodiment, encoding the data with the intra-device ECC includes generating intra-device redundancy bits, and the information includes the intra-device redundancy bits. Decoding the intra-device and inter-device ECCs may include exporting the intra-device redundancy bits from one or more of the storage devices.

In a disclosed embodiment, decoding the intra-device ECC includes computing soft metrics of respective bits of the at least part of the data, and the information includes the soft metrics. In another embodiment, encoding the data with the inter-device ECC includes dividing the data into pages including data bits, computing a respective parity bit for the data bits in each bit position within the pages, sending the pages for storage on respective ones of the storage devices, and sending the parity bits for storage on another of the storage devices. In an embodiment, decoding the intra-device and inter-device ECCs includes identifying at least one bit position for which the data bits read from the storage devices are inconsistent with the respective parity bit, and decoding the intra-device ECC based on the identified at least one bit position.

In yet another embodiment, decoding the intra-device ECC includes modifying soft metrics of one or more of the data bits located in the identified bit positions in the pages, and decoding the intra-device ECC based on the modified soft metrics. In still another embodiment, decoding the intra-device ECC includes modifying bit values of one or more of the data bits located in the identified bit positions in the pages, and decoding the intra-device ECC based on the modified bit values.

In some embodiments, encoding the data with the inter-device and intra-device ECCs includes encoding the data with a systematic ECC to produce redundancy bits, and dividing the redundancy bits for storage among the two or more storage devices, decoding the intra-device ECC includes decoding a portion of the data stored on a given storage device using only a subset of the redundancy bits that are stored on the given storage device, and decoding the inter-device ECC includes decoding the entire data using the redundancy bits stored on the two or more storage devices. In an embodiment, the systematic ECC includes a Low Density Parity Check (LDPC) code.

In a disclosed embodiment, decoding the intra-device and inter-device ECCs includes performing alternating decoding iterations of the intra-device and inter-device ECCs, and transferring soft metrics between the decoding iterations of the intra-device and inter-device ECCs. In another embodiment, encoding the data with the inter-device ECC includes mirroring the data in the two or more storage devices, and decoding the intra-device and inter-device ECCs includes computing soft metrics of respective bits in each of the storage devices, combining the soft metrics of corresponding bits stored on the two or more storage devices, and decoding the intra-device ECC using the combined soft metrics. In an embodiment, the information is related to the inter-device ECC, and decoding the intra-device and inter-device ECCs includes sending the information to a given storage device, and decoding the intra-device ECC in the given storage device responsively to the information.

There is additionally provided, in accordance with an embodiment of the present invention, a method for data storage, including:

receiving data items having respective logical storage locations for storage on a storage device;

storing the data items, together with respective indications of the logical storage locations, at successive available physical storage locations on the storage device; and retrieving the data items from the storage device by reading the data items and the respective indications sequentially from the storage device, and outputting the read data items according to the indications.

In an embodiment, the data items include parity pages, which are produced from data pages that are stored on at least one other storage device.

There is also provided, in accordance with an embodiment of the present invention, a method for data storage, including:

storing data items having respective logical storage locations on a first storage device;

backing-up the data items on a second storage device by storing the data items, together with respective indications of the logical storage locations, at successive available physical storage locations on the second storage device; and upon a failure in the first storage device, restoring the data items from the second storage device by reading the data items and the respective indications sequentially from the second storage device, and storing the read data items on a third storage device according to the indications.

In some embodiments, the first storage device includes a Solid State Disk (SSD). In some embodiments, the second storage device includes a Hard Disk Drive (HDD). In an embodiment, backing-up the data items includes holding a data structure indicating the available physical storage locations on the second storage device, and storing the data items at the successive available physical storage locations includes skipping physical storage locations that are indicated by the data structure as unavailable. In another embodiment, storing and backing-up the data items include notifying one of the first and second storage devices whether a given data item comprises data or redundancy information.

There is additionally provided, in accordance with an embodiment of the present invention, apparatus for data storage, including:

two or more storage devices, each of which is configured to encode data with an intra-device Error Correction Code (ECC) and to store the encoded data on the storage device;

a controller, which is configured to encode input data with an inter-device ECC, to send the input data encoded with the inter-device ECC to the two or more storage devices, for subsequent encoding with the intra-device ECC and storage; and a joint decoder, which is configured to retrieve and output at least part of the stored input data by decoding the intra-device and inter-device ECCs, while using information related to one of the intra-device and inter-device ECCs in decoding the other of the intra-device and inter-device ECCs.

There is additionally provided, in accordance with an embodiment of the present invention, apparatus for data storage, including:

a storage device; and a controller, which is configured to receive data items having respective logical storage locations for storage on the storage device, to store the data items, together with respective indications of the logical storage locations, at successive available physical storage locations on the storage device, and to retrieve the data items from the storage device by reading the data items and the respective indications sequentially from the storage device, and outputting the read data items according to the indications.

There is further provided, in accordance with an embodiment of the present invention, apparatus for data storage, including:

first and second storage devices; and a controller, which is configured to store data items having respective logical storage locations on the first storage device, to back-up the data items on the second storage device by storing the data items, together with respective indications of the logical storage locations, at successive available physical storage locations on the second storage device, and, upon a failure in the first storage device, to restore the data items from the second storage device by reading the data items and the respective indications sequentially from the second storage device, and to store the read data items on a third storage device according to the indications.

The present invention will be more fully understood from the following detailed description of the embodiments thereof, taken together with the drawings in which:

BRIEF DESCRIPTION OF THE DRAWINGS

FIG. 2 is a flow chart that schematically illustrates a method for data storage and retrieval, in accordance with an embodiment of the present invention;

FIGS. 3-5 are flow charts that schematically illustrate methods for joint decoding of inter-disk and intra-disk Error Correction Codes (ECC), in accordance with embodiments of the present invention;

DETAILED DESCRIPTION OF EMBODIMENTS

Overview

Embodiments of the present invention provide improved methods and systems for data storage in multiple storage devices. These methods and systems encode the data for storage using two types of Error Correction Codes (ECC), which are referred to as inter-device ECC and intra-device ECC. The inter-device ECC introduces redundancy into the data before it is distributed among the different storage devices. The intra-device ECC, on the other hand, is applied by each individual storage device to the portion of the data that is to be stored on that device (and that is already encoded with the inter-device ECC).

The methods and systems described herein decode the intra-device and inter-device ECCs jointly, by using information related to one ECC in decoding the other. Joint decoding of the intra-device and inter-device ECCs improves the decoding performance, and thus the data storage reliability of the system, in comparison with independent decoding of each ECC. Several examples of joint decoding methods are described hereinbelow. Example interfaces that enable these methods are also described.

Other methods and systems that are described herein enable fast storage of data items on storage devices having relatively slow random access time, such as Hard Disk Drives (HDD). In some embodiments, data items having respective logical addresses are accepted for storage. The data items are stored by writing them sequentially, in successive available physical storage locations on the storage device, regardless of whether the logical addresses of the data items are sequential or not. When a given data item is stored on the storage device, an indication of the logical address of this data item is stored together with the data. When retrieving a given data item, the corresponding logical address is retrieved and used.

When using these methods in a HDD, the sequential storage reduces the amount of mechanical movement required from the HDD head, and thus reduces the storage time. Generally, however, this technique can be used to improve the random access speed of various other types of storage devices. Several example applications and system configurations that use this technique are described below, such as hybrid HDD/SSD configurations. Since the disclosed methods enable deploying low-cost and high-endurance storage devices (e.g., HDD) for fast random access applications, they are able to reduce the cost and increase the endurance of storage systems.

Data Storage and Retrieval Using Inter-Disk and Intra-Disk ECC

Figure 1:
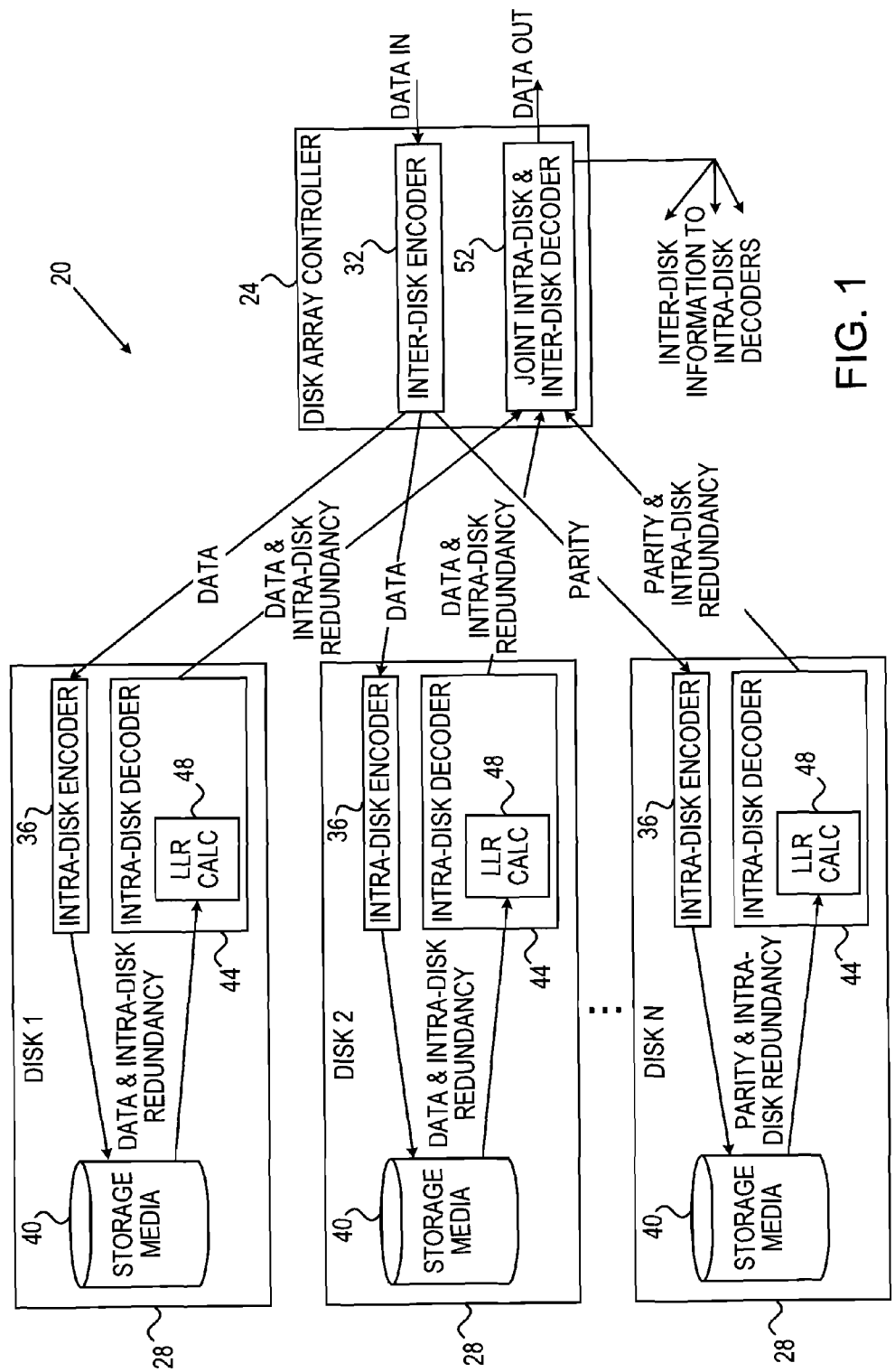
FIG. 1 is a block diagram that schematically illustrates a data storage system, in accordance with an embodiment of the present invention.

FIG. 1 is a block diagram that schematically illustrates a data storage system 20, in accordance with an embodiment of the present invention. System 20 comprises a disk array controller 24, which stores data in two or more storage devices 28, in the present example Hard Disk Drives (HDD). The number of storage devices is denoted N. Any desired number of storage devices can be used. Alternatively to magnetic storage disks, the storage devices may comprise any other suitable type of storage devices, such as Solid State Disks (SSD), Direct Access Storage Devices (DASD) or RAID sub-arrays. Further alternatively, the methods and systems described herein can also be used in a system comprising a memory controller that controls an array of individual solid state memory devices, such as a group of Flash devices or other non-volatile devices. In this embodiment, each memory chip is regarded as a separate storage device. The storage devices of system 20 may be of a single type or of mixed types, such as a combination of one or more HDD and one or more SSD.

In order to increase storage reliability and recover from disk failures, system 20 encodes the data stored in storage devices 28 using two types of Error Correction Codes (ECC). The first ECC, which is referred to herein as inter-disk or inter-device ECC, introduces redundancy into the data before it is distributed among the different storage devices. The inter-disk ECC is applied by an inter-disk encoder 32 in the array controller. The second ECC, which is referred to herein as intra-disk or intra-device ECC, is applied by each individual storage device, to the data that is to be stored on that device. Each storage device 28 comprises an intra-disk encoder 36, which encodes the data received for storage on that storage device with the intra-disk ECC. The intra-disk encoder in each storage device typically applies the intra-disk ECC independently of the intra-disk encoding performed in the other storage devices.

Each device 28 further comprises storage media 40 (e.g., magnetic media or solid state memory) for storing the data. In some embodiments, each device 28 comprises an intra-disk decoder 44 for decoding the intra-disk ECC. The intra-disk decoder may comprise a Log-Likelihood Ratio (LLR) calculation unit, whose role is explained in detail further below.

In a typical flow, controller 24 receives data for storage from a host system or other source. Inter-disk encoder 32 in controller 24 encodes the data with the inter-disk ECC, and distributes the encoded data among devices 28 for storage. Each device 28 receives part of the data (which is already encoded with the inter-disk ECC), encodes this data with the intra-disk ECC, and stores the data in media 40.

In order to retrieve certain data, the storage device on which the data is stored reads the data from media 40, and decodes the intra-disk ECC using intra-disk decoder 44. The storage device sends the raw data read from media 40 (including both data bits and the redundancy introduced by the intra-disk ECC) to controller 24.

Controller 24 comprises a joint ECC decoder 52, which performs joint decoding of the intra-disk ECC and the inter-disk ECC using the raw data sent from storage devices 28. The joint decoder typically uses information derived from one ECC in order to decode the other. Several examples of joint ECC decoding methods are described further below. These techniques use information derived from the intra-disk ECC to decode the inter-disk ECC, or vice versa. Joint decoding of the intra-disk and inter-disk ECC is extremely powerful in recovering from data errors as well as disk failures.

Note that generally each storage device 28 decodes the intra-disk ECC locally using decoder 44, in addition to the joint decoding performed by decoder 52 in the controller. In some embodiments, each storage device attempts to decode the intra-disk ECC locally, and joint decoding is reverted to only in the event of decoding failure in a device. When using this technique, the raw data is sent to controller 24 only if the storage device fails to decode the intra-disk ECC. Otherwise, the device sends to the controller only the data after intra-disk ECC decoding. As a result, data throughput over the interfaces between storage devices 28 and controller 24 is reduced. Additionally or alternatively, intra-disk decoders 44 may compute soft metrics, e.g., LLRs, which are later used by joint decoder 52 in the joint ECC decoding process.

Each of the inter-disk and the intra-disk ECC may comprise any suitable type of ECC, such as a parity code, a Reed-Solomon code, a Bose-Chaudhuri-Hocquenghem code, a Low Density Parity Check (LDPC) code, a Turbo code, a Turbo Product Code (TPC), a Trellis Coded Modulation (TCM) code, an incremental code or any other suitable type of ECC. The inter-disk and intra-disk ECC may generally be of the same type or of different types. When belonging to the same code type, the intra-disk and inter-disk ECC may have the same or different attributes (e.g., LDPC codes with different parity equations, or convolution codes with different levels of puncturing).

In the description that follows, the inter-disk ECC comprises a parity code. In this scheme, inter-disk encoder 32 divides the data for storage into N−1 pages. Encoder 32 produces a parity page, in which each bit is set to be the XOR of the respective bits in the N−1 data pages. In other words, the $k^{th}$ bit of the parity page is set to be the XOR of the N−1 $k^{th}$ bits of the N−1 data pages. N−1 of storage devices 28 are regarded as data devices, and the $N^{th}$ device is regarded as a parity device. Controller 24 sends the N−1 data pages for storage in the N−1 data devices, respectively. The parity page is sent for storage in the parity device. (Generally, the N storage devices may serve the roles of data device and parity device. In other words, a given storage device 28 may serve as a data device for certain data and as a parity device for other data.) When using this scheme, the data can be recovered without error in the event of failure of any single storage device.

In some embodiments, intra-disk decoders 44 decode the intra-disk ECC using hard decoding, in which case the raw data that is sent from storage devices 28 to controller 24 comprises the data bits and the intra-disk ECC redundancy bits. In alternative embodiments, intra-disk decoders 44 decode the intra-disk ECC using a soft decoding process, which operates on soft metrics of the stored bits. The soft metric of a given bit typically comprises a value, which is indicative of the confidence level of that bit or a probability that this bit is "0" or "1". In the present example, LLR calculation unit 48 in each disk calculates the LLRs of the bits read from media 40, and intra-disk decoder 40 uses the LLRs as soft metrics for decoding the intra-disk ECC. Alternatively, any other suitable kind of soft metric can be used. The soft metrics may also comprise soft values of the bits, i.e., values that were read from media 40 at a resolution of two or more bits.

In some embodiments, storage devices 28 send the LLRs or other soft metrics to joint decoder 52, and the joint decoder uses these metrics in the joint ECC decoding process. In other words, the raw data sent from storage devices 28 to controller 24 may comprise the LLRs or other soft metrics (possibly in addition to the intra-disk redundancy bits). Certain aspects of ECC decoding using soft metrics are addressed, for example, in PCT International Publications WO 2007/132457 and WO 2008/053472, which are assigned to the assignee of the present patent application and whose disclosures are incorporated herein by reference.

The system configuration shown in FIG. 1 is an example configuration, which is chosen purely for the sake of conceptual clarity. In alternative embodiments, system 20 may have any other suitable configuration that performs joint decoding of the inter-disk and intra-disk ECC. For example, intra-disk decoders 44 in storage devices 28 may be omitted. In this embodiment, ECC decoding is performed exclusively by joint decoder 52 in controller 24. Additionally or alternatively, encoding with the intra-disk ECC need not necessarily be performed by each individual storage device. For example, in some embodiments a single unit (e.g., in the array controller) performs both intra-device ECC encoding of the data to be sent to the different storage devices, as well as inter-device ECC encoding. As noted above, the embodiments described herein refer mainly to disks. The reference to disks, however, is chosen purely by way of example, and the disclosed techniques are similarly applicable to any other suitable type of storage device.

FIG. 2 is a flow chart that schematically illustrates a method for data storage and retrieval carried out by system 20, in accordance with an embodiment of the present invention. The method begins with inter-disk encoder 32 in controller 24 encoding data for storage with the inter-disk ECC, at an inter-disk encoding step 60. In the present example, the inter-disk ECC comprises a parity code. Controller 24 sends the data pages to the disks designated as data disks, and the parity page to the disk designated as parity disk, at a storage sending step 64. Each disk 28 encodes the page received from the controller with the intra-disk ECC, at an intra-disk encoding step 68. Each disk stores its respective page on media 40. The intra-disk encoding and storage is typically the same in the data disks and in the parity disk. In some embodiments, each disk is unaware of whether the page it encodes and stores is a data page or a parity page.

At a later time, controller 24 requests to retrieve one or more data pages from one or more disks 28. For example, the controller may receive a request from the host system to retrieve certain data. In order to retrieve the data, disks 28 read and send the data and parity pages, as well as the respective intra-disk redundancy bits, at a readout step 72. Typically, a given disk reads the page in question (which was locally encoded with the intra-disk redundancy) from its respective media 40. The disk sends the page, including the intra-disk redundancy bits, to controller 24.

Upon receiving the information, joint ECC decoder 52 in controller 24 performs joint decoding of the intra-disk and inter-disk ECC, at a joint decoding step 76. Several examples of joint decoding methods that can be used to implement step 76 are explained below. The joint decoding process produces the requested data. Controller 24 outputs the requested data, at an output step 80.

FIG. 3 is a flow chart that schematically illustrates a method for joint decoding of inter-disk and intra-disk ECC, in accordance with an embodiment of the present invention. This method can be used, for example, to implement step 76 of the method of FIG. 2 above. The method of FIG. 3 assumes that intra-disk decoders 40 apply soft decoding using LLRs or other soft metrics, and is typically invoked when a given intra-disk decoder 44 in a given disk 28 fails to decode the intra-disk ECC locally.

The method begins with joint ECC decoder 52 receiving a set of N−1 data pages and a corresponding parity page of the inter-disk ECC. Decoder 52 identifies one or more bit positions in which the data bits are inconsistent with the respective parity bit, at a parity inconsistency detection step 90. The assumption is that the data in these bit positions is regarded as less reliable, and may have been the cause of the intra-disk ECC decoding failure.

Decoder 52 reduces the LLRs of the data bits in the identified bit positions, at a metric reduction step 94. The LLR (or other metric) reduction reflects the lower reliability of these bits. In some embodiments, decoder 52 may set the LLRs in the identified bit positions to zero, or to any other suitable value. Decoder 52 sends the modified LLRs to the intra-disk decoder in question, i.e., the intra-disk decoder which failed to decode the intra-disk ECC. The intra-disk decoder re-attempts to decode the intra-disk ECC using the modified LLRs, at a re-decoding step 98. In an alternative embodiment, the re-decoding operation is carried out in joint decoder 52.

Decoder 52 checks whether the second intra-disk ECC decoding attempt is successful, at a success checking step 102. If successful, the method terminates at a termination step 106. Otherwise, decoder 52 may attempt to recover the data using other means, e.g., using the inter-disk ECC, at an inter-disk decoding step 110. If the data page of a given data disk cannot be recovered, the data pages of the other data disks can be recovered using the inter-disk parity page.

In the method of FIG. 3, information from the inter-disk ECC (identified bit positions in which the data is inconsistent with the inter-disk parity) is used to improve the performance of intra-disk ECC decoding (by modifying the LLRs used for intra-disk ECC decoding).

In an alternative embodiment, for a given bit position identified at step 90 (in which the data is inconsistent with the inter-disk parity), decoder 52 may examine the LLRs of the data bits in this bit position in the different data pages. The joint decoder may flip (reverse) the value of one or more bits having the lowest (poorest) LLR. Then, decoder 52 may perform (or instruct intra-disk decoder 44 to perform) hard intra-disk decoding of the data pages having the flipped bits.

Figure 4:
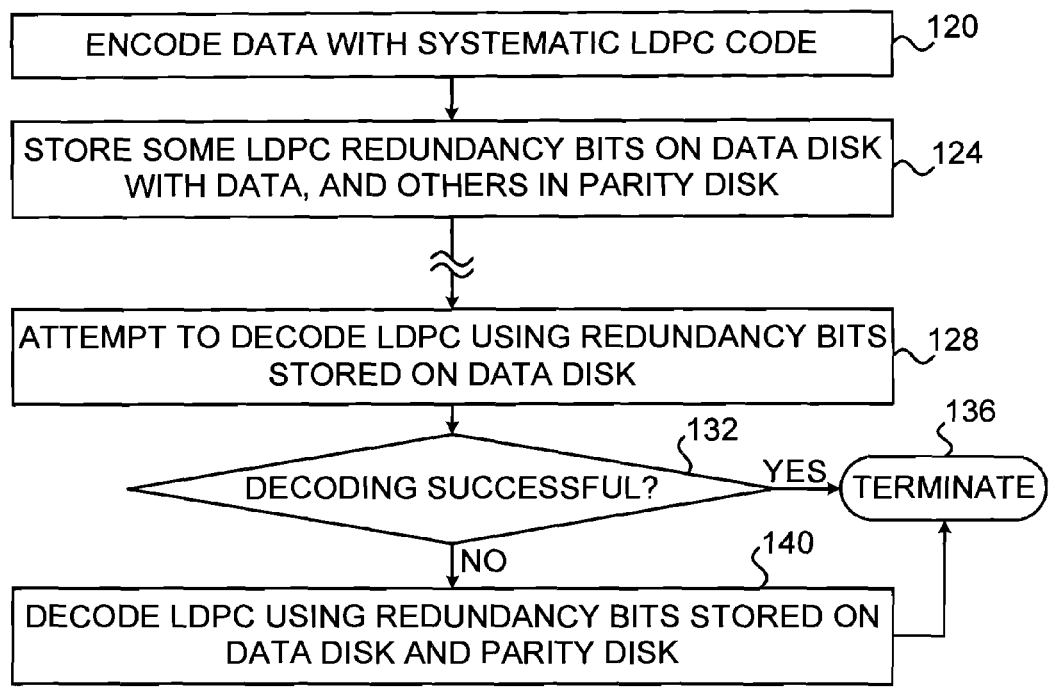

FIG. 4 is a flow chart that schematically illustrates a method for joint decoding of inter-disk and intra-disk ECC, in accordance with another embodiment of the present invention. The method of FIG. 4 uses the fact that some ECC types can be decoded using only part of the redundancy information. An LDPC code, for example, can be decoded (at different performance levels) using different subsets of the redundancy bits added during encoding.

The method begins with inter-disk encoder 32 encoding the data for storage with a systematic LDPC code, at a LDPC encoding step 120. (A systematic code, as is known in the art, is a code that preserves the original data bits and adds redundancy bits to them.) Controller 24 divides the resulting LDPC code word and sends it for storage, at an LDPC storage step 124. The controller divides the LDPC code word so that some of the redundancy bits are stored on the parity disk, and some of the LDPC redundancy bits are stored with the data bits on the data disks. In other words, each data disk stores part of the LDPC redundancy bits in addition to data bits.

When attempting to retrieve the data from a given disk, intra-disk ECC decoder 44 of that disk (or decoder 52) initially attempts to decode the data bits stored locally on the disk using only the redundancy bits that are stored on the same disk, at a local LDPC decoding step 128. Decoder 44 or 52 checks whether the local decoding attempt was successful, at a success checking step 132. If successful, the method terminates at a termination step 136. Otherwise, joint decoder 52 decodes the entire LDPC code word using the data from the other data disks and the parity disk, at a joint LDPC decoding step 140. The joint decoding typically uses the LLRs provided by the different intra-disk ECC decoders.

In the method of FIG. 4, the same LDPC code is used for both intra-disk and inter-disk ECC decoding. The intra-disk decoding process attempts to decode the subset of data bits stored on a given disk using the subset of redundancy bits stored on that disk. The inter-disk decoding process decodes the entire LDPC code word stored on the multiple disks. Although the description above refers to LDPC, the method of FIG. 4 can be used with any other suitable type of ECC, which is capable of decoding a subset of the data bits using a subset of the redundancy bits, such as, for example, incremental codes, punctured convolution codes in which punctured redundancy bits are added in the inter-disk ECC, and Turbo Product Codes (TPC) in which the intra-disk ECC is applied to data rows and the inter-disk ECC is applied to data columns.

In some embodiments, joint decoder 52 may apply iterative product code decoding, i.e., perform alternate intra-disk ECC and inter-disk ECC decoding iterations, while transferring LLR (or other metric values) between the two decoding processes.

As yet another example of joint intra-disk and inter-disk ECC decoding, consider a configuration in which controller 24 mirrors the data to two or more disks 28. In other words, the inter-disk ECC comprises a repetition code. All the disks use the same intra-disk ECC, which is decoded using soft metrics of the data bits (e.g., LLRs). When intra-disk ECC decoding fails in a give disk, the disk transfers the soft metrics to controller 24. If intra-disk ECC decoding fails in all disks, the controller combines (e.g., averages) the soft metrics of corresponding bits in the multiple disks. Intra-disk ECC decoding is then re-attempted (in the controller or in one of the disks) using the combined soft metrics. This technique is effective, for example, in reducing random noise in the data read from media 40.

Further additionally or alternatively, system 20 can apply any other suitable joint decoding process that combines intra-disk and inter-disk ECC decoding.

The above-described joint decoding methods provide superior resilience to impairments (e.g., noise and distortion) in media 40, and therefore improve the endurance, reliability and storage capacity of the system.

Enhanced Intra-Disk ECC Decoding Performance Using Feedback from Inter-Disk ECC

In some embodiments, decoder 52 in controller 24 sends information, which is derived from inter-disk ECC decoding, to intra-disk ECC decoders 44 in disks 28. The intra-disk decoders use this information to improve the performance of the intra-disk ECC decoding process. In some embodiments, the information is sent from controller 24 selectively, e.g., in the event of intra-disk ECC decoding failure.

Figure 5:
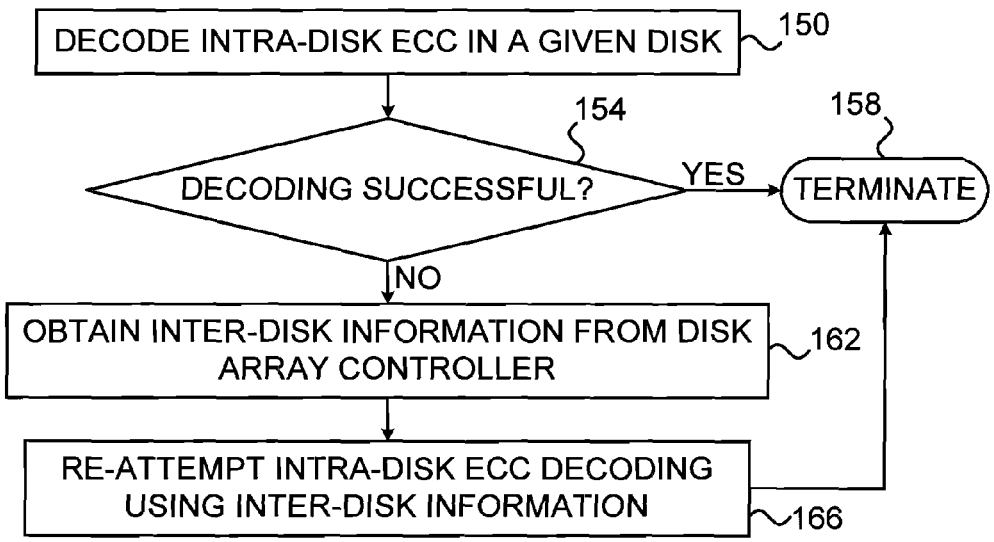

FIG. 5 is a flow chart that schematically illustrates a method for joint decoding of inter-disk and intra-disk ECC, in accordance with an alternative embodiment of the present invention. The method begins with intra-disk decoder 44 in a given disk 28 decoding the intra-disk ECC, at an intra-disk decoding step 150. The intra-disk decoder checks whether the decoding attempt was successful, at a success checking step 154. If successful, the method terminates at a termination step 158.

Otherwise, i.e., if intra-disk ECC decoding has failed, the intra-disk decoder obtains information regarding the inter-disk ECC from controller 24, at an inter-disk information retrieval step 162. The intra-disk decoder then re-attempts to decode the intra-disk ECC using the inter-disk information, at an intra-disk re-decoding step 166.

Various kinds of information related to the inter-disk ECC can be useful for improving the performance of intra-disk ECC decoding. For example, such information may comprise bit positions in which the data bits are inconsistent with the respective inter-disk parity, as described in FIG. 3 above. The intra-disk decoder may use this sort of information by reducing (and specifically setting to zero) the LLRs of these bit positions. Alternatively, the intra-disk decoder may substitute alternative bit values into the identified bit positions (e.g., at random or according to any suitable logic), and reattempt to decode the intra-disk ECC. ECC decoding techniques using bit substitution is described, for example, by Chase in "A Class of Algorithms for Decoding Block Codes with Channel Measurement Information," IEEE Transactions on Information Theory, Volume IT-18, No. 1, January, 1972, pages 170-182, which is incorporated herein by reference.

The method of FIG. 5 is particularly useful when the intra-disk ECC is decoded using a soft decoding process (e.g., soft LDPC decoder), and when the inter-disk ECC comprises a parity code. Nevertheless, this technique can be used with any other suitable intra-disk and inter-disk ECC. In some embodiments, controller 24 and disks 28 support a command interface for transferring information related to the inter-disk ECC from the controller to the disks.

Data Mirroring in Storage Devices of Different Types

In some applications, data is stored in a primary storage device and backed-up (mirrored) in a secondary storage device. It is sometimes desirable to use primary and secondary storage device of different types, e.g., for lowering the overall system cost. For example, it may be beneficial to use a Solid State Disk (SSD) for primary storage and a Hard Disk Drive (HDD) for backup, since HDDs typically have considerably lower cost, larger storage capacity and higher endurance in comparison with SSD. On the other hand, HDDs usually have a significantly slower access time, particularly for random (i.e., non-sequential) programming, because such random access operations involve mechanical head movements in the HDD.

Embodiments of the present invention provide improved methods and systems for data backup and recovery, which enable using slow random-access storage devices for back-up storage, with little or no degradation of the overall system storage speed.

Figure 6:
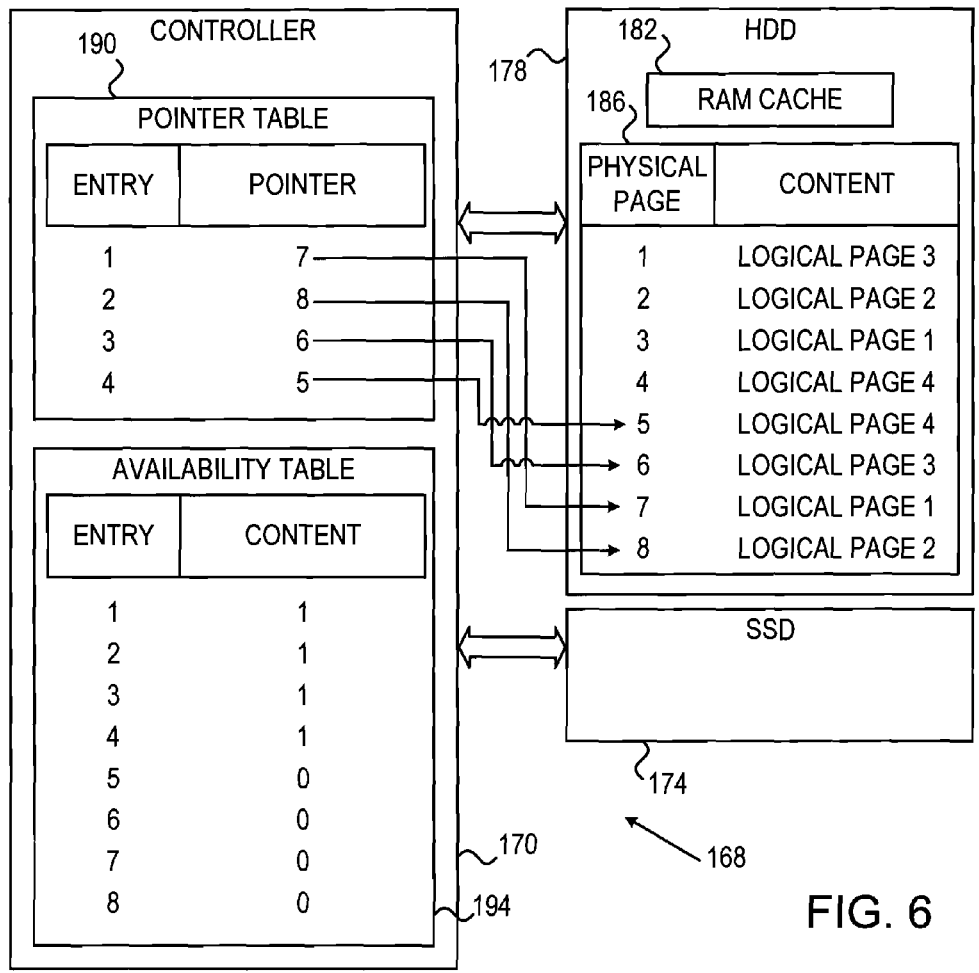
FIG. 6 is a block diagram that schematically illustrates a data storage system, in accordance with an alternative embodiment of the present invention.

FIG. 6 is a block diagram that schematically illustrates a data storage system 168, in accordance with an alternative embodiment of the present invention. System 168 comprises a controller 170, which stores data in a primary storage device 174 and a secondary storage device 178. In the present example, the primary storage device comprises a SSD and the secondary storage device comprises a HDD, although any other suitable types of storage devices can also be used.

Controller 170 stores data pages in SSD 174 according to logical addresses assigned to the data pages. (The description that follows refers to data pages, and to logical and physical addresses. Generally, however, the disclosed techniques can be used with other sorts of data items and in other sorts of logical and physical storage locations.) In addition, controller 170 backs-up each data page in HDD 178.

In the present example, the SSD is capable of storing 25 million pages, each of which is 4 KB in size. The HDD is capable of storing 300 GB of memory in 4 KB pages. These figures are given purely by way of example, and any other suitable capacities and page sizes can also be used.

HDD 178 comprises a Random Access Memory (RAM) cache 182 and magnetic storage media 186. When a certain data page is sent to the HDD for storage, the page is first cached in cache 182 and then copied to a certain physical page on media 186. If a failure occurs in SSD 174 or in the data stored in the SSD, the controller may initiate a restoration process, in which the data is restored from HDD 178 into another SSD.

Since writing and reading of data in media 186 involves mechanical movement of the HDD head, it is highly desirable to write and read the media sequentially, i.e., write and read data into and out of sequential physical pages. Non-sequential programming and readout reduces the HDD access speed considerably. The effect of non-sequential readout is particularly harmful when restoring the data from the HDD. The impact of non-sequential programming is especially noticeable when performing real-time back-up of stored data. The data storage scheme described below enables sequential programming and readout in HDD 178, which reduces unnecessary movement of the HDD head and therefore improves the HDD access time.

In the example of FIG. 6, controller 170 holds two tables, namely a PointerTable 190 and an AvailabilityTable 194. The two tables are typically stored in the controller's RAM. The PointerTable table has an entry for each SSD page (i.e., 25 million entries in the present example). The entry of a given SSD page indicates the physical page in which the most up-to-date copy of this SSD page is backed-up in the HDD. If the SSD page was never programmed, the corresponding PointerTable entry can be marked with "−1" or any other suitable indication.

The AvailabilityTable table has a Boolean (one-bit) entry for each physical page of the HDD. The entry of a given HDD physical page is "0" if the physical page contains valid (up-to-date) data, and "1" otherwise (i.e., if data was never written to this physical page or if the last data backed-up to this physical page was re-written to another physical page). The entry of a given physical page is also set to "0" if the physical page has been identified as a bad page. In other words, the AvailabilityTable of a given HDD physical page is "1" if the physical page is available for storing new data, and "0" otherwise.

Figure 7:
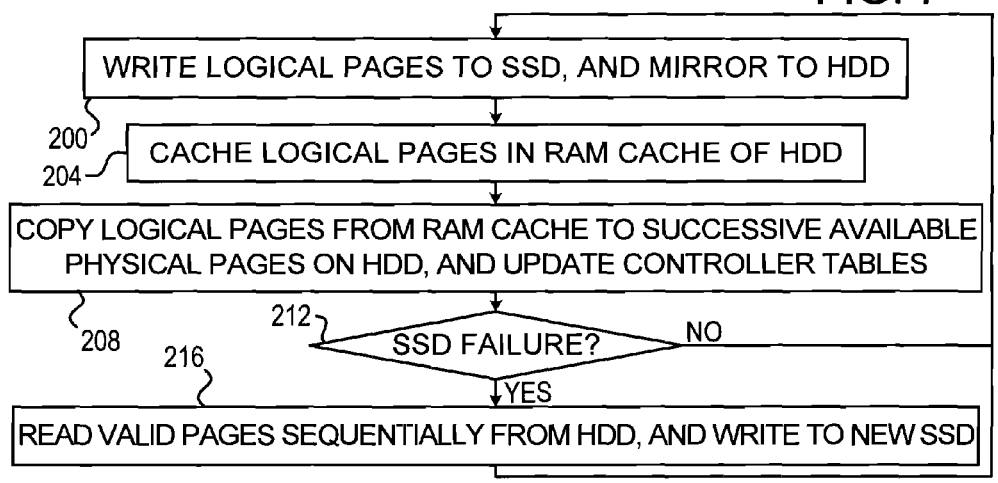
FIG. 7 is a flow chart that schematically illustrates a method for data storage and retrieval, in accordance with another embodiment of the present invention.

FIG. 7 is a flow chart that schematically illustrates a method for data storage and retrieval in system 168, in accordance with another embodiment of the present invention. The method begins with controller 170 storing data in SSD 174 and sending the data for back-up in HDD 178, at a storage step 200. Each data page has a certain logical address, which is used for storing the data page in the SSD. The data pages are also referred to herein as logical pages for clarity.

HDD 178 caches the logical pages received from controller 170 in RAM cache 182, at a HDD caching step 204. The HDD then copies the logical pages to physical pages in media 186, at a HDD storage step 208. When copying the logical pages, the HDD stores the logical pages in successive available physical pages on media 186. Typically, the HDD head is moved, and the pages read from the RAM cache are stored in successive physical pages traversed by the head, while skipping unavailable physical pages (pages whose AvailabilityTable entry is "0").

When a logical page L (i.e., a page whose logical address in SSD 174 is L) is backed-up in a physical HSS page X, the HSS stores the logical address of this page (or an indication of this address) is stored in the same physical HDD page together with the data. In addition, the PointerTable and AvailabilityTable tables are updated as follows:

AvailabilityTable(X) is set to "0", to indicate that physical HDD page X now holds up-to-date data and is not available for storing data.

AvailabilityTable(PointerTable(L)) is set to "1", to indicate that the previous physical page in which logical page L was stored is now available for storing new data.

PointerTable(L) is set to X, to indicate that logical page L is backed-up in physical page X in the HDD.

At a certain point in time, controller 170 initiates a restoration process, which restores the data from HDD 178 to another SSD. This process may be triggered by various kinds of failures, such as, for example, failure to program data, failure to read data, a notification of SSD failure, or for various other reasons. In the present example, controller 170 checks failure has occurred, at a failure checking step 212. If no failure has occurred, the method loops back to step 200 above, and controller 170 continues to store data in SSD 174 and back-up the data in HDD 178.

If, on the other hand, failure was detected at step 212, controller 170 reads the data that is backed-up in HDD 216 and stores the restored data in another SSD, at a restoration step 216. When reading the data from the HDD, the data is read sequentially from successive physical pages (and thus reducing unnecessary HDD head movements and the associated reading time). The readout process typically skips physical pages whose AvailabilityTable entry is "1".

When reading the data from a given HDD physical page, the indication of the logical address (that was stored together with the data at step 208) is read from this page, as well. The restored data is written to the new SSD according to these logical addresses.

In summary, the method of FIG. 7 stores data items having respective logical addresses (that are not necessarily sequential) in sequential available physical storage locations on a storage device. When storing a data item, an indication of its logical address is stored, as well. When retrieving a given data item, the corresponding logical address can be read and used.

The above-described scheme can be extended and used in various other systems and applications. For example, this scheme can be used in storage systems having multiple SSDs, e.g., RAID systems that produce parity pages. In an example implementation, the parity pages produced in such a system can be stored on HDD, whereas the data pages can be stored on SSD. The method of FIG. 7 can be used to write the parity pages sequentially (and thus at high speed) into the HDD, and to recover from loss of data pages or from SSD failures. Consequently, the random write performance of the system is improved considerably.

The method of FIG. 7 can also be used in HDD-based RAID systems, e.g., in order to improve their random write performance. For example, all parity pages can be stored on a single HDD using the method of FIG. 7, i.e., sequentially and at high speed. Unlike known HDD-based RAID systems in which each random write operation requires modification of data in one disk and a parity in another disk, when using the disclosed method only one of the disks has to move. This technique can improve the random write performance of an HDD RAID array by a factor of two (since every random write operation occupies only the data HDD for a seek time duration, while in the conventional solution every random write operation occupies two HDDs (both the data and the parity HDDs) for a seek time duration).

In another embodiment of a RAID system, both data and parity pages can be stored in the different storage devices using the method described of FIG. 7. As a result, both data and parity information is stored sequentially and at high speed, even when the logical addresses of the pages are not sequential. Further alternatively, the method of FIG. 7 can be used for storing data on a single storage device, in order to improve random write performance.

Although the description of FIGS. 6 and 7 above focused on SSDs and HDDs, the disclosed techniques are in no way limited to these types of storage devices, and may be used with various other storage device types. In some embodiments, a RAID system may store the parity pages in Single-Level Cell (SLC) SSD, and the data pages in Multi-Level Cell (MLC) SSD. As another example, parity pages and data pages can be stored in the same SSD, but in separate blocks. The separate blocks are regarded as separate storage devices in this context. For example, parity pages can be stored in SLC blocks, and data pages can be stored in MLC blocks, in the same SSD or on multiple SSDs. In still another embodiment, both parity and data pages are stored in MLC blocks, but the system assigns separate blocks for parity and for data in order to improve write efficiency. Further additionally or alternatively, any other suitable types of storage devices can be used.

Moreover, the technique of FIGS. 6 and 7 is not limited to backup applications or to the use of multiple storage devices, and can be used to improve the random write performance of a single storage device, as well. Consider, for example, a storage device that is controlled by a controller. The storage device in the present example has high sequential write performance, but relatively poor random write performance. Such a device may comprise, for example, a HDD or magnetic tape.

In some embodiments, the controller accepts data items, together with respective logical addresses (logical storage locations) of the data items, for storage on the storage device. The controller stores the data items, together with respective indications of the logical addresses, at successive available physical storage locations on the storage device. Since this storage operation is performed on successive physical storage locations and not on random locations, the storage speed is relatively high. For example, in a HDD, writing into sequential physical storage locations can typically be performed without unnecessary mechanical movement of the HDD head.

When requested to retrieve one or more data items from certain logical addresses, the controller reads the data items sequentially from the physical locations on the storage device. Each data item is retrieved with the corresponding indication of its logical address. Using the indications, the controller outputs the data items corresponding to the requested logical addresses.

The above-described technique provides a considerable improvement in random write performance. In some cases, this improvement comes at the expense of some degradation in read performance. In many applications, however, this degradation is tolerable. This technique may therefore be particularly suitable for applications that are insensitive to reading speed, such as some remote backup applications.

Typically, controllers 24 and 170 comprise general-purpose processors, which are programmed in software to carry out the functions described herein. The software may be downloaded to the processors in electronic form, over a network, for example, or it may, alternatively or additionally, be provided and/or stored on tangible media, such as magnetic, optical, or electronic memory.

In some embodiments, the controller and the storage devices support a command interface, using which the controller notifies a given storage device whether a given data item contains data or parity (or other redundancy). This interface is useful, for example, when both parity pages and data pages are stored on the same storage device but in different blocks. The storage device in question can determine where and how to store a given page based on its role (data or parity), as notified by the controller. This interface can be used in any system configuration, such as in system 20 of FIG. 1 above and system 168 of FIG. 6 above.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method for data storage, comprising:
encoding data with an inter-device Error Correction Code (ECC), and sending the encoded data for storage on two or more storage devices;
encoding the data to be stored on each of the storage devices, and which has been encoded with the inter-device ECC, with an intra-device ECC, and storing the data encoded with the inter-device and intra-device ECCs on the storage device; and
after storing the data, retrieving and outputting at least part of the stored data by decoding the intra-device and inter-device ECCs, while using information related to one of the intra-device and inter-device ECCs in decoding the other of the intra-device and inter-device ECCs,
wherein encoding the data with the inter-device ECC comprises dividing the data into pages comprising data bits, computing a respective parity bit for the data bits in each bit position within the pages, sending the pages for storage on respective ones of the storage devices, and sending the parity bits for storage on another of the storage devices.

2. The method according to claim 1, wherein the storage devices comprise at least one device type selected from a group of types consisting of a magnetic disk, a Solid State Disk (SSD), a Direct Access Storage Device (DASD), a solid state memory device, a memory chip, a Multi-Chip Package (MCP) memory device and a disk sub-array.

3. The method according to claim 1, wherein the information is related to the inter-device ECC, and wherein retrieving the at least part of the data comprises making an attempt to decode the intra-device ECC independently of the information, and decoding the intra-device ECC using the information responsively to a failure of the attempt.

4. The method according to claim 1, wherein encoding the data with the intra-device ECC comprises generating intra-device redundancy bits, and wherein the information comprises the intra-device redundancy bits.

5. The method according to claim 4, wherein decoding the intra-device and inter-device ECCs comprises exporting the intra-device redundancy bits from one or more of the storage devices.

6. The method according to claim 1, wherein decoding the intra-device and inter-device ECCs comprises identifying at least one bit position for which the data bits read from the storage devices are inconsistent with the respective parity bit, and decoding the intra-device ECC based on the identified at least one bit position.

7. The method according to claim 6, wherein decoding the intra-device ECC comprises modifying soft metrics of one or more of the data bits located in the identified bit positions in the pages, and decoding the intra-device ECC based on the modified soft metrics.

8. The method according to claim 6, wherein decoding the intra-device ECC comprises modifying bit values of one or more of the data bits located in the identified bit positions in the pages, and decoding the intra-device ECC based on the modified bit values.

9. The method according to claim 1, wherein encoding the data with the inter-device and intra-device ECCs comprises encoding the data with a systematic ECC to produce redundancy bits, and dividing the redundancy bits for storage among the two or more storage devices, wherein decoding the intra-device ECC comprises decoding a portion of the data stored on a given storage device using only a subset of the redundancy bits that are stored on the given storage device, and wherein decoding the inter-device ECC comprises decoding the entire data using the redundancy bits stored on the two or more storage devices.

10. The method according to claim 9, wherein the systematic ECC comprises a Low Density Parity Check (LDPC) code.

11. The method according to claim 1, wherein decoding the intra-device and inter-device ECCs comprises performing alternating decoding iterations of the intra-device and inter-device ECCs, and transferring soft metrics between the decoding iterations of the intra-device and inter-device ECCs.

12. The method according to claim 1, wherein encoding the data with the inter-device ECC comprises mirroring the data in the two or more storage devices, and wherein decoding the intra-device and inter-device ECCs comprises computing soft metrics of respective bits in each of the storage devices, combining the soft metrics of corresponding bits stored on the two or more storage devices, and decoding the intra-device ECC using the combined soft metrics.

13. A method for data storage, comprising:
encoding data with an inter-device Error Correction Code (ECC), and sending the encoded data for storage on two or more storage devices;
encoding the data to be stored on each of the storage devices, and which has been encoded with the inter-device ECC, with an intra-device ECC, and storing the data encoded with the inter-device and intra-device ECCs on the storage device; and
after storing the data, retrieving and outputting at least part of the stored data by decoding the intra-device and inter-device ECCs, while using information related to one of the intra-device and inter-device ECCs in decoding the other of the intra-device and inter-device ECCs,
wherein decoding the intra-device ECC comprises computing soft metrics of respective bits of the at least part of the data, and wherein the information comprises the soft metrics.

14. A method for data storage, comprising:
encoding data with an inter-device Error Correction Code (ECC), and sending the encoded data for storage on two or more storage devices;
encoding the data to be stored on each of the storage devices, and which has been encoded with the inter-device ECC, with an intra-device ECC, and storing the data encoded with the inter-device and intra-device ECCs on the storage device; and
after storing the data, retrieving and outputting at least part of the stored data by decoding the intra-device and inter-device ECCs, while using information related to one of the intra-device and inter-device ECCs in decoding the other of the intra-device and inter-device ECCs,
wherein the information is related to the inter-device ECC, and wherein decoding the intra-device and inter-device ECCs comprises sending the information to a given storage device, and decoding the intra-device ECC in the given storage device responsively to the information.

15. Apparatus for data storage, comprising:
two or more storage devices, each of which is configured to encode data with an intra-device Error Correction Code (ECC) and to store the encoded data on the storage device;
a controller, which is configured to encode input data with an inter-device ECC, to send the input data encoded with the inter-device ECC to the two or more storage devices, for subsequent encoding with the intra-device ECC and storage; and
a joint decoder, which is configured to retrieve and output at least part of the stored input data by decoding the intra-device and inter-device ECCs, while using information related to one of the intra-device and inter-device ECCs in decoding the other of the intra-device and inter-device ECCs,
wherein the controller is configured to encode the input data with the inter-device ECC by dividing the input data into pages comprising data bits, computing a respective parity bit for the data bits in each bit position within the pages, sending the pages for storage on respective ones of the storage devices, and sending the parity bits for storage on another of the storage devices.

16. The apparatus according to claim 15, wherein the storage devices comprise at least one device type selected from a group of types consisting of a magnetic disk, a Solid State Disk (SSD), a Direct Access Storage Device (DASD), a solid state memory device, a memory chip, a Multi-Chip Package (MCP) memory device and a disk sub-array.

17. The apparatus according to claim 15, wherein the information is related to the inter-device ECC, wherein each storage device is configured to make an attempt to decode the intra-device ECC independently of the information, and wherein the joint decoder is configured to decode the intra-device ECC using the information responsively to a failure of the attempt.

18. The apparatus according to claim 15, wherein each storage device is configured to generate intra-device redundancy bits when encoding the data with the intra-device ECC, and wherein the information comprises the intra-device redundancy bits.

19. The apparatus according to claim 18, wherein each storage device is configured to export the intra-device redundancy bits to the controller.

20. The apparatus according to claim 15, wherein the joint decoder is configured to identify at least one bit position for which the data bits read from the storage devices are inconsistent with the respective parity bit, and to decode the intra-device ECC based on the identified at least one bit position.

21. The apparatus according to claim 20, wherein the joint decoder is configured to modify soft metrics of one or more of the data bits located in the identified bit positions in the pages, and to decode the intra-device ECC based on the modified soft metrics.

22. The apparatus according to claim 20, wherein the joint decoder is configured to modify bit values of one or more of the data bits located in the identified bit positions in the pages, and to decode the intra-device ECC based on the modified bit values.

23. The apparatus according to claim 15, wherein the controller is configured to encode the input data with a systematic ECC to produce redundancy bits, and to divide the redundancy bits for storage among the two or more storage devices, wherein a given storage device is configured to decode the intra-device ECC by decoding a portion of the input data stored on the given storage device using only a subset of the redundancy bits that are stored on the given storage device, and wherein the joint decoder is configured to decode the entire input data using the redundancy bits stored on the two or more storage devices.

24. The apparatus according to claim 23, wherein the systematic ECC comprises a Low Density Parity Check (LDPC) code.

25. The apparatus according to claim 15, wherein the joint decoder is configured to perform alternating decoding iterations of the intra-device and inter-device ECCs, and to transfer soft metrics between the decoding iterations of the intra-device and inter-device ECCs.

26. The apparatus according to claim 15, wherein the controller is configured to mirror the input data in the two or more storage devices, wherein each storage device is configured to compute soft metrics of respective bits of the input data stored on the storage device, and wherein the joint decoder is configured to combine the soft metrics of corresponding bits stored on the two or more storage devices, and to decode the intra-device ECC using the combined soft metrics.

27. Apparatus for data storage, comprising:
two or more storage devices, each of which is configured to encode data with an intra-device Error Correction Code (ECC) and to store the encoded data on the storage device;
a controller, which is configured to encode input data with an inter-device ECC, to send the input data encoded with the inter-device ECC to the two or more storage devices, for subsequent encoding with the intra-device ECC and storage; and
a joint decoder, which is configured to retrieve and output at least part of the stored input data by decoding the intra-device and inter-device ECCs, while using information related to one of the intra-device and inter-device ECCs in decoding the other of the intra-device and inter-device ECCs,
wherein the storage devices are configured to compute soft metrics of respective bits of the at least part of the input data, and wherein the information comprises the soft metrics.

28. Apparatus for data storage, comprising:
two or more storage devices, each of which is configured to encode data with an intra-device Error Correction Code (ECC) and to store the encoded data on the storage device;
a controller, which is configured to encode input data with an inter-device ECC, to send the input data encoded with the inter-device ECC to the two or more storage devices, for subsequent encoding with the intra-device ECC and storage; and
a joint decoder, which is configured to retrieve and output at least part of the stored input data by decoding the intra-device and inter-device ECCs, while using information related to one of the intra-device and inter-device ECCs in decoding the other of the intra-device and inter-device ECCs,
wherein the information is related to the inter-device ECC, and wherein the joint decoder is configured to send the information to a given storage device, and to cause the given storage device to decode the intra-device ECC responsively to the information.

* * * * *